United States Patent
Xu et al.

(10) Patent No.: US 10,042,894 B2
(45) Date of Patent: *Aug. 7, 2018

(54) TEMPORAL-BASED PROFESSIONAL SIMILARITY

(71) Applicant: Microsoft Technology Licensing, LLC, Redmond, WA (US)

(72) Inventors: Ye Xu, Hanover, NH (US); Zang Li, Milpitas, CA (US); Abhishek Gupta, San Francisco, CA (US); Ahmet Bugdayci, San Francisco, CA (US); Anmol Bhasin, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 745 days.

This patent is subject to a terminal disclaimer.

(21) Appl. No.: 14/528,643

(22) Filed: Oct. 30, 2014

(65) Prior Publication Data

US 2015/0120714 A1    Apr. 30, 2015

Related U.S. Application Data

(60) Provisional application No. 61/898,293, filed on Oct. 31, 2013.

(51) Int. Cl.
*G06F 7/00* (2006.01)
*G06F 17/30* (2006.01)
*G06Q 50/00* (2012.01)

(52) U.S. Cl.
CPC ......... *G06F 17/3053* (2013.01); *G06Q 50/01* (2013.01)

(58) Field of Classification Search
CPC .................... G06F 17/3053; G06Q 50/01
(Continued)

(56) References Cited

U.S. PATENT DOCUMENTS

| | | | | |
|---|---|---|---|---|
| 6,622,139 B1 * | 9/2003 | Nakayama | ........ | G06F 17/30014 707/749 |
| 8,332,252 B2 * | 12/2012 | Buisson | ................ | G06Q 10/06 705/7.23 |

(Continued)

*Primary Examiner* — Binh Van Ho
(74) *Attorney, Agent, or Firm* — Schwegman Lundberg & Woessner, P.A.

(57) ABSTRACT

A system and method for temporal-based professional similarity are provided. In example embodiments, a request to identify, from among a plurality of member profiles of a social network service, a profile that is similar to a source profile, is received. Profile data of the source profile and a candidate profile are accessed from the social network service. Profile features are extracted from the profile data. The profile features include source features extracted from the profile data of the source profile and candidate features extracted from the profile data of the candidate profile. Respective profile features correspond to temporal data included in the profile data. Data structures are generated by structuring the profile features according to the temporal data. The data structures include a source data structure generated using the source features and a candidate data structure generated using the candidate features. A profile similarity score is determined by comparing the candidate data structure with the source data structure. The profile similarity score indicates the similarity between the candidate profile and the source profile.

20 Claims, 22 Drawing Sheets

(58) Field of Classification Search
 USPC .......................................................... 707/723
 See application file for complete search history.

(56) References Cited

U.S. PATENT DOCUMENTS

| | | | | |
|---|---|---|---|---|
| 8,458,100 | B1* | 6/2013 | Nowak, Jr. ............ | G06Q 10/06 705/321 |
| 8,706,739 | B1* | 4/2014 | Song ................. | G06F 17/30867 707/748 |
| 9,558,271 | B1* | 1/2017 | Sathe ................ | G06F 17/30734 |
| 2002/0002479 | A1* | 1/2002 | Almog ........... | G06Q 10/063112 705/7.14 |
| 2003/0078821 | A1* | 4/2003 | Gorur .................... | G06Q 10/06 705/7.42 |
| 2003/0117444 | A1* | 6/2003 | Puram .................... | G06Q 40/04 715/810 |
| 2004/0010425 | A1* | 1/2004 | Wilkes .................. | A47B 81/00 705/3 |
| 2004/0148180 | A1* | 7/2004 | Pajwani ................. | G06Q 10/10 705/321 |
| 2004/0163040 | A1* | 8/2004 | Hansen ................. | G06Q 10/00 715/224 |
| 2005/0114339 | A1* | 5/2005 | Challener ............ | G06F 17/3056 |
| 2007/0214035 | A1* | 9/2007 | Walsh ................... | G06Q 10/10 705/321 |
| 2008/0162569 | A1* | 7/2008 | Schifone ............ | G06F 17/30017 |
| 2008/0201162 | A1* | 8/2008 | Hart ....................... | G06Q 10/00 705/1.1 |
| 2009/0094239 | A1* | 4/2009 | Sabol ..................... | G06Q 10/10 |
| 2009/0276209 | A1* | 11/2009 | Dane ..................... | G06F 17/271 704/9 |
| 2010/0114789 | A1* | 5/2010 | Dane ...................... | G06Q 10/06 705/321 |
| 2010/0153289 | A1* | 6/2010 | Schneiderman ..... | G06Q 10/105 705/320 |
| 2010/0153290 | A1* | 6/2010 | Duggan ............. | G06Q 10/1053 705/321 |
| 2011/0060633 | A1* | 3/2011 | Janakiraman .......... | G06Q 10/10 705/14.16 |
| 2011/0202567 | A1* | 8/2011 | Bach ................. | G06F 17/30743 707/784 |
| 2011/0313943 | A1* | 12/2011 | McCagg ................ | G06Q 10/00 705/321 |
| 2012/0023083 | A1* | 1/2012 | McCagg ................ | G06Q 10/10 707/706 |
| 2012/0030126 | A1* | 2/2012 | McCagg ................ | G06Q 10/00 705/321 |
| 2012/0117094 | A1* | 5/2012 | Pratt ..................... | G06Q 10/06 707/758 |
| 2013/0159204 | A1* | 6/2013 | Vianello ........ | G06Q 10/063112 705/321 |
| 2013/0290205 | A1* | 10/2013 | Bonmassar ........ | G06Q 10/1053 705/321 |
| 2014/0006299 | A1* | 1/2014 | Acree ................ | G06Q 10/1053 705/321 |
| 2014/0058954 | A1* | 2/2014 | Perlstein ............ | G06Q 10/1053 705/80 |
| 2014/0136433 | A1* | 5/2014 | Posse ............. | G06Q 10/063112 705/319 |
| 2015/0006421 | A1* | 1/2015 | Pearson ............. | G06Q 10/1053 705/321 |
| 2015/0006422 | A1* | 1/2015 | Carter ................ | G06Q 10/1053 705/321 |

\* cited by examiner

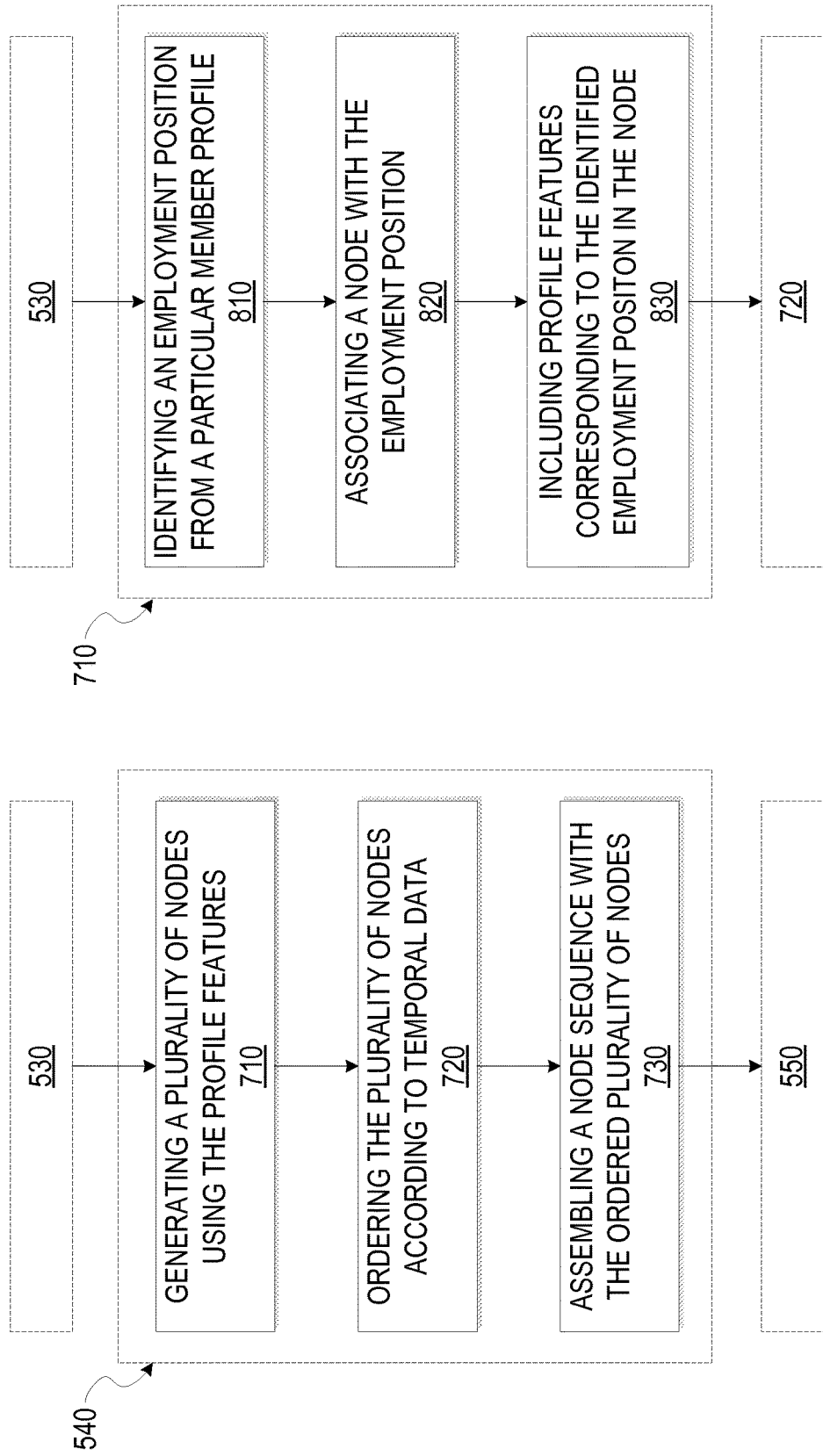

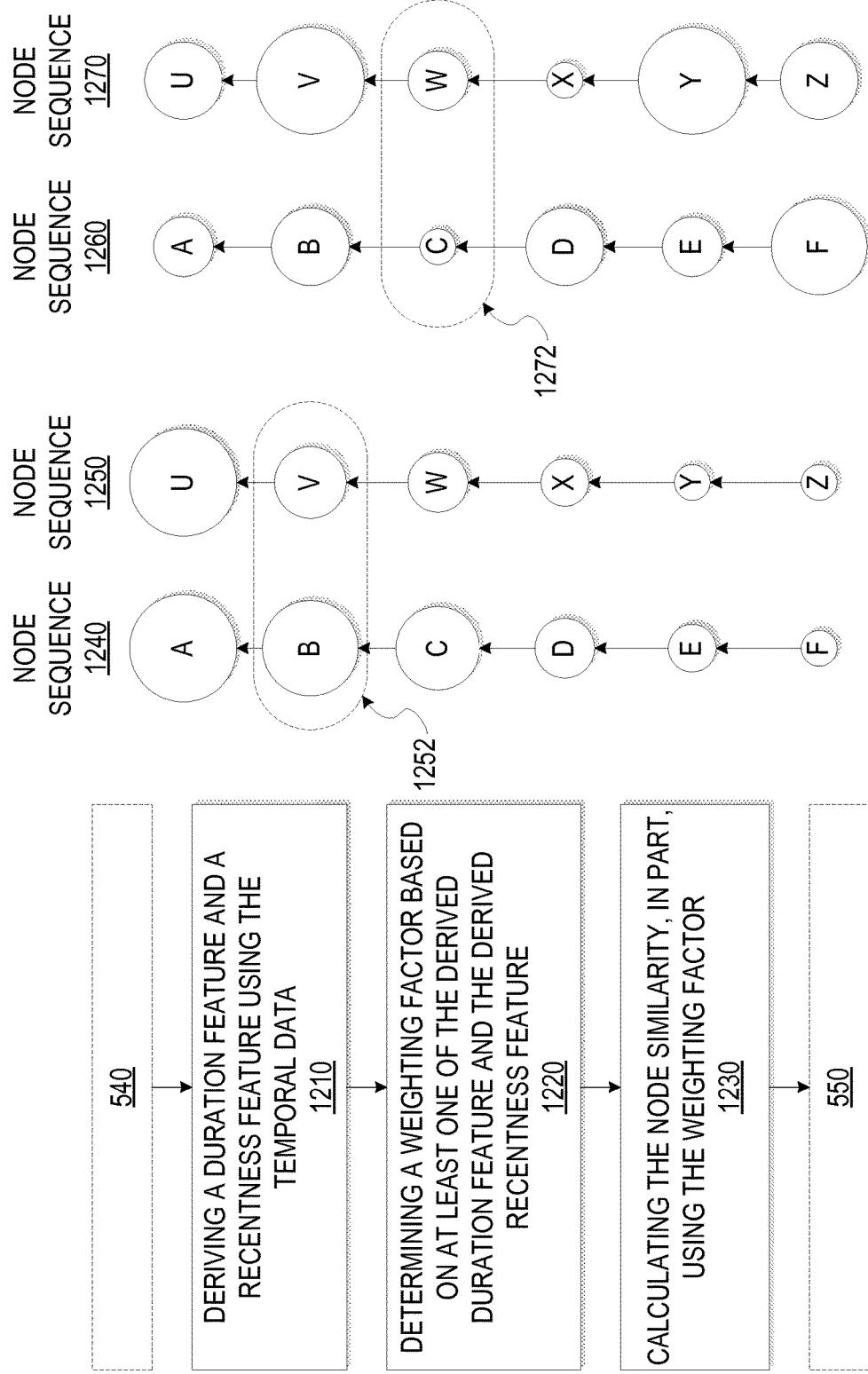

PROFILES SIMILAR TO DESMOND JENKINS

RESULTS FOR PROFILES WITH SIMILAR CAREER PATHS TO DESMOND JENKINS

JOHN SMITH (1ST)
SR. SOFTWARE ENGINEER
PALO ALTO, CA | INTERNET
CURRENT: ACME PRODUCTS
PAST: MICROSOFT
EDUCATION: U OF MICHIGAN
CONNECTIONS: 212

FRED FLIN
SR. SOFTWARE ENGINEER
SAN JOSE, CA | INTERNET
CURRENT: GAMES R GREAT
PAST: ACME PRODUCTS
EDUCATION: UTC COMMUNITY
CONNECTIONS: 19

SALLY ALLEN
SR. SOFTWARE ENGINEER
SAN MATEO, CA | INTERNET
CURRENT: ZYNGA
PAST: ACME PRODUCTS
EDUCATION: HARVARD
CONNECTIONS: 519

TED KIMBO
SR. SOFTWARE ENGINEER
PALO ALTO, CA | INTERNET
CURRENT: STEALTH
PAST: ACME PRODUCTS
EDUCATION: BERKELEY
CONNECTIONS: 500

ERIC TROTZKY
SR. SOFTWARE ENGINEER
SAN MATEO, CA | INTERNET
CURRENT: ZYNGA
PAST: GOOGLE
EDUCATION: YALE
CONNECTIONS: 127

TEMPORAL-BASED PROFESSIONAL SIMILARITY

RELATED APPLICATIONS

This application claims the priority benefit of U.S. Provisional Application No. 61/898,293, entitled "MODELING PROFESSIONAL SIMILARITY BY MINING PROFESSIONAL CAREER TRAJECTORIES," filed Oct. 31, 2013, which is hereby incorporated by reference in its entirety.

TECHNICAL FIELD

Embodiments of the present disclosure relate generally to online social networking and, more particularly, but not by way of limitation, to temporal-based professional similarity.

BACKGROUND

For decades large corporations as well as labor placement services have maintained extensive yet static resume databanks. Online professional networks like LinkedIn® have taken these resume databanks to a dynamic, constantly updated and massive scale, professional profile dataset spanning career records from hundreds of industries, millions of companies and hundreds of millions of people worldwide.

BRIEF DESCRIPTION OF THE DRAWINGS

Various ones of the appended drawings merely illustrate example embodiments of the present disclosure and cannot be considered as limiting its scope.

FIG. 7 is a flow diagram illustrating an example method for assembling a node sequence, according to some example embodiments.

FIG. 8 is a flow diagram illustrating an example method for generating a node that includes profile features, according to some example embodiments.

FIG. 12A is a flow diagram illustrating an example method for calculating a node similarity score using a weighting factor, according to some example embodiments.

FIGS. 12B and 12C are block diagrams further illustrating examples of calculating a node similarity score using a weighting factor, according to some example embodiments.

FIGS. 20 and 21 illustrate example user interfaces, according to some example embodiments.

Figure 1:
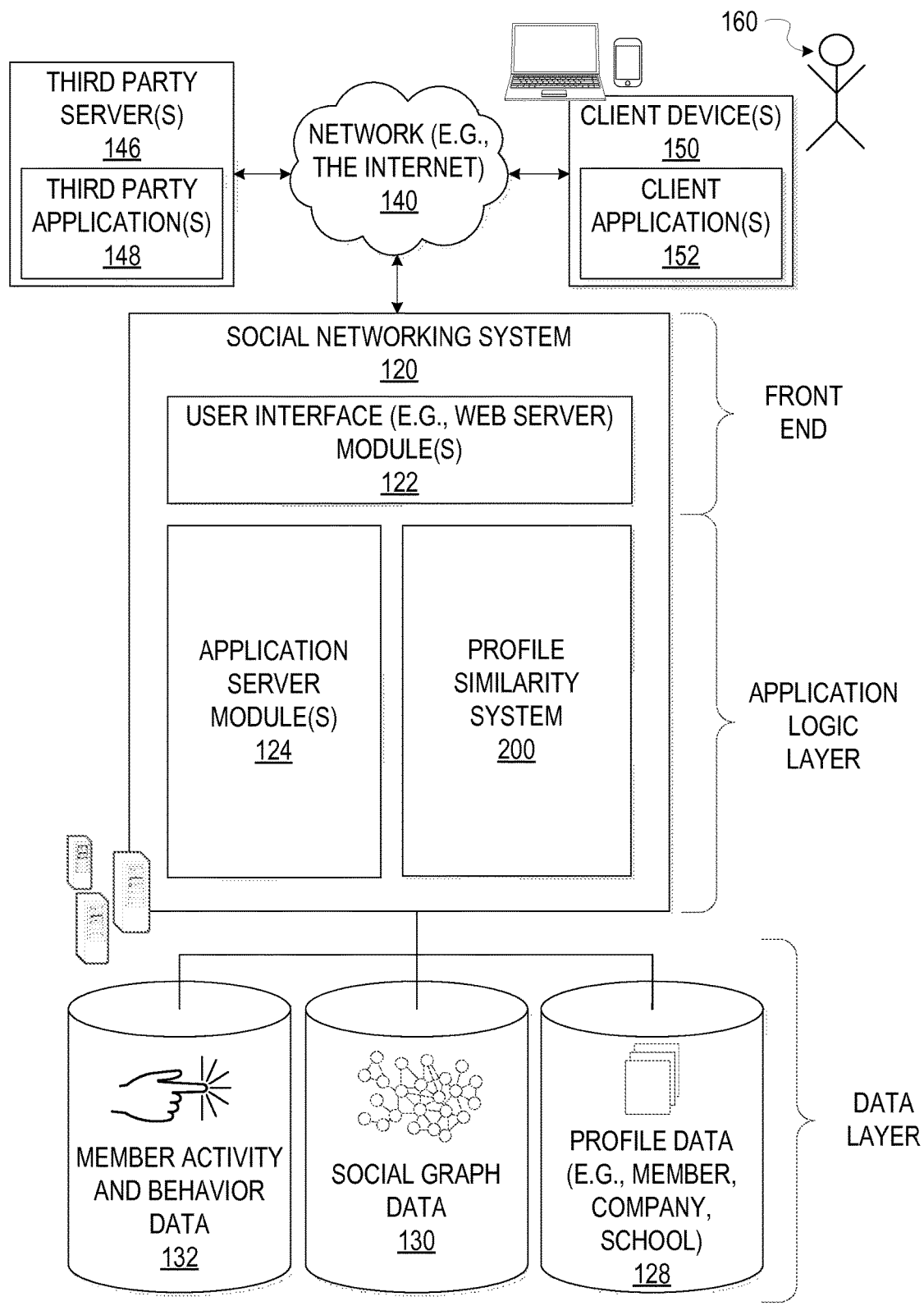
FIG. 1 is a network diagram depicting a client-server system within which various example embodiments may be deployed.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Online professional networks maintain extensive and dynamic professional profiles. Profiles of individuals can be modeled as a sequence of positions held by the individual as a time-series of nodes, each of which represents one particular position or job experience in the individual's career trajectory. These career trajectory models can be employed in various applications including identifying similar profiles using temporal data associated with the sequence of positions, career trajectory planning, and decoding sequences to uncover paths leading to certain professional milestones from a current professional status.

In various example embodiments, a request to identify one or more member profile of a social network service that are similar to a source profile is received. For instance, a user can indicate or designate the source member profile using a user interface of a client device (e.g., the user browsing profiles on the social network service and designating one as the source profile). In some instances, the user specifies search parameters (e.g., a position, a time period for the position, an education level, a seniority level) and the source profile is identified according to the search parameters.

Profile data of the source profile and a plurality of candidate profiles are accessed from the social network service. The profile data for a particular member of the social network service includes current and past positions and jobs held by the particular member, educational history (e.g., universities attended and degrees conferred), and other member data corresponding to the particular member.

Profile features are extracted from the profile data. The profile features include source features extracted from the profile data of the source profile and candidate features extracted from the profile data of the candidate profile. All, or some, of the profile features correspond to temporal data included in the profile data. For example, a particular profile feature could be a position held by a particular member corresponding to the profile data. In this example, the temporal data comprises a position start date, position end date, or other temporal data associated with the position.

Subsequent to extracting the profile features, data structures are generated by structuring the profile features according to the temporal data corresponding to respective profile features. The data structures include a source data structure generated using the source features and a candidate data structure generated using the candidate features. In an embodiment, the data structures are temporally ordered node sequences wherein each node of the sequence includes at least one of the extracted profile features. In an example, the node sequence comprises nodes corresponding to positions, extracted from a particular member profile, held by a member of the particular member profile. In this example, the nodes are ordered from most recent position held to least recent position held.

After the source data structure and the candidate data structure are generated, a profile similarity score is calculated by comparing the candidate data structure with the source data structure. The profile similarity score indicates the similarity between the candidate profile and the source profile. For instance, a node sequence of the source profile and a node sequence of the candidate profile are compared by aligning the node sequences and performing a node-wise comparison (e.g., forming aligned node pairs between the node sequences the nodes of the aligned node pairs). In some embodiments, a node-wise comparison is performed for various alignments between the node sequences and an optimal alignment is found. The comparison between the node sequences includes, in some embodiments, other factors such as temporal-based weighting (e.g., more recent experience is more influential in computing the profile similarity score), skipping nodes in a particular node sequence, employment transition data (e.g., changes in seniority level or job title), and so forth. In this way, member profiles from among the plurality of candidate profiles from the social network service that are similar to the source profile are identified utilizing the temporal data included in the member profile data of the source profile and the plurality of candidate profiles.

As shown in FIG. 1, the social networking system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social networking system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such an architecture.

As shown in FIG. 1, the front end layer consists of a user interface module(s) (e.g., a web server) 122, which receives requests from various client-computing devices including one or more client device(s) 150, and communicates appropriate responses to the requesting device. For example, the user interface module(s) 122 may receive requests in the form of Hypertext Transport Protocol (HTTP) requests, or other web-based, Application Programming Interface (API) requests. The client device(s) 150 may be executing conventional web browser applications and/or applications (also referred to as "apps") that have been developed for a specific platform to include any of a wide variety of mobile computing devices and mobile-specific operating systems (e.g., iOS™, Android™ Windows® Phone). For example, client device(s) 150 may be executing client application(s) 152. The client application(s) 152 may provide functionality to present information to the user and communicate via the network 140 to exchange information with the social networking system 120. Each of the client devices 150 may comprise a computing device that includes at least a display and communication capabilities with the network 140 to access the social networking system 120. The client devices 150 may comprise, but are not limited to, remote devices, work stations, computers, general purpose computers, Internet appliances, hand-held devices, wireless devices, portable devices, wearable computers, cellular or mobile phones, personal digital assistants (PDAs), smart phones, tablets, ultrabooks, netbooks, laptops, desktops, multi-processor systems, microprocessor-based or programmable consumer electronics, game consoles, set-top boxes, network PCs, mini-computers, and the like. One or more users 160 may be a person, a machine, or other means of interacting with the client device(s) 150. The user(s) 160 may interact with the social networking system 120 via the client device(s) 150. The user(s) 160 may not be part of the networked environment, but may be associated with client device(s) 150.

As shown in FIG. 1, the data layer includes several databases, including a database 128 for storing data for various entities of the social graph, including member profiles, company profiles, educational institution profiles, as well as information concerning various online or offline groups. Of course, with various alternative embodiments, any number of other entities might be included in the social graph, and as such, various other databases may be used to store data corresponding with other entities.

Consistent with some embodiments, when a person initially registers to become a member of the social networking service, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, interests, and so on. This information is stored, for example, as profile data in the database 128.

Once registered, a member may invite other members, or be invited by other members, to connect via the social networking service. A "connection" may specify a bi-lateral agreement by the members, such that both members acknowledge the establishment of the connection. Similarly, with some embodiments, a member may elect to "follow" another member. In contrast to establishing a connection, the concept of "following" another member typically is a unilateral operation, and at least with some embodiments, does not require acknowledgement or approval by the member that is being followed. When one member connects with or follows another member, the member who is connected to or following the other member may receive messages or updates (e.g., content items) in his or her personalized content stream about various activities undertaken by the other member. More specifically, the messages or updates presented in the content stream may be authored and/or published or shared by the other member, or may be automatically generated based on some activity or event involving the other member. In addition to following another member, a member may elect to follow a company, a topic, a conversation, a web page, or some other entity or object, which may or may not be included in the social graph maintained by the social networking system. With some embodiments, because the content selection algorithm selects content relating to or associated with the particular entities that a member is connected with or is following, as a member connects with and/or follows other entities, the universe of available content items for presentation to the member in his or her content stream increases.

As members interact with various applications, content, and user interfaces of the social networking system 120, information relating to the member's activity and behavior may be stored in a database, such as the database 132.

The social networking system 120 may provide a broad range of other applications and services that allow members the opportunity to share and receive information, often customized to the interests of the member. For example, with some embodiments, the social networking system 120 may include a photo sharing application that allows members to upload and share photos with other members. With some embodiments, members of the social networking system 120 may be able to self-organize into groups, or interest groups, organized around a subject matter or topic of interest. With some embodiments, members may subscribe to or join groups affiliated with one or more companies. For instance, with some embodiments, members of the social network service may indicate an affiliation with a company at which they are employed, such that news and events pertaining to the company are automatically communicated to the members in their personalized activity or content streams. With some embodiments, members may be allowed to subscribe to receive information concerning companies other than the company with which they are employed. Membership in a group, a subscription or following relationship with a company or group, as well as an employment relationship with a company, are all examples of different types of relationships that may exist between different entities, as defined by the social graph and modeled with social graph data of the database 130.

The application logic layer includes various application server module(s) 124, which, in conjunction with the user interface module(s) 122, generates various user interfaces with data retrieved from various data sources or data services in the data layer. With some embodiments, individual application server modules 124 are used to implement the functionality associated with various applications, services and features of the social networking system 120. For instance, a messaging application, such as an email application, an instant messaging application, or some hybrid or variation of the two, may be implemented with one or more application server modules 124. A photo sharing application may be implemented with one or more application server modules 124. Similarly, a search engine enabling users to search for and browse member profiles may be implemented with one or more application server modules 124. Of course, other applications and services may be separately embodied in their own application server module(s) 124. As illustrated in FIG. 1, social networking system 120 may include a profile similarity system 200, which is described in more detail below.

Additionally, a third party application(s) 148, executing on a third party server(s) 146, is shown as being communicatively coupled to the social networking system 120 and the client device(s) 150. The third party server(s) 146 may support one or more features or functions on a website hosted by the third party.

Figure 2:
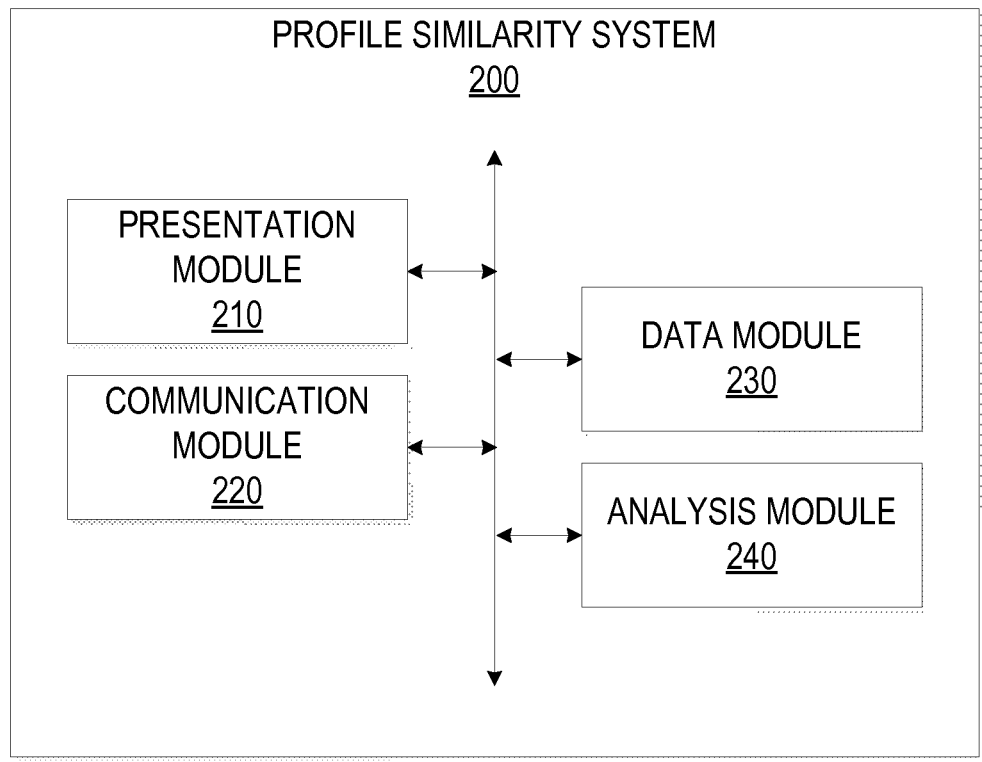
FIG. 2 is a block diagram illustrating an example embodiment of a profile similarity system.

FIG. 2 is a block diagram of the profile similarity system 200 that provides functionality to identify one or more member profiles of the social network service that are similar to the source profile, according to some example embodiments. In an example embodiment, the profile similarity system 200 includes a presentation module 210, a communication module 220, a data module 230, and an analysis module 240. All, or some, of the modules 210-240 of FIG. 2, communicate with each other, for example, via a network coupling, shared memory, and the like. It will be appreciated that each module of modules 210-240 can be implemented as a single module, combined into other modules, or further subdivided into multiple modules. Other modules not pertinent to example embodiments can also be included, but are not shown.

In some implementations, the presentation module 210 provides various presentation and user interface functionality operable to interactively present and receive information from the user. For instance, the presentation module 210 can cause presentation of identified similar profiles to a user device (e.g., the client device(s) 150) of the user (e.g., user 160). In various implementations, the presentation module 210 presents or causes presentation of information (e.g., visually displaying information on a screen, acoustic output, haptic feedback). Interactively presenting information is intended to include the exchange of information between a particular device and the user. The user can provide input to interact with the user interface in many possible manners such as alphanumeric, point based (e.g., cursor), tactile, or other input (e.g., touch screen, tactile sensor, light sensor, infrared sensor, biometric sensor, microphone, gyroscope, accelerometer, or other sensors), and the like. It will be appreciated that the presentation module 210 provides many other user interfaces to facilitate functionality described herein. Further, it will be appreciated that "presenting" as used herein is intended to include communicating information or instructions to a particular device that is operable to perform presentation based on the communicated information or instructions.

The communication module 220 provides various communications functionality and web services. For example, the communication module 220 provides network communication such as communicating with components of the social networking system 120, the client device(s) 150, and the third party server(s) 146. In various example embodiments, the network communication may operate over wired or wireless modalities. Web services are intended to include retrieving information from the third party server(s) 146, the client device(s) 150, and other devices communicatively coupled to the social networking system 120.

The data module 230 provides various data functionality such as exchanging information with databases or servers. For example, the data module 230 may access member profiles, of the social network service, that include profile data from the database 128. Similarly, the data module 230 accesses social graph data and member activity and behavior data from respective databases 130 and 132. In some example embodiments, the data module 230 exchanges information with third party server(s) 146, client device(s) 150, or other sources of information.

The analysis module 240 provides functionality to perform a variety of analyses to facilitate the functionality described herein. For example, the analysis module 240 analyzes the profile features, attributes, or characteristics extracted from the profile data. In a specific non-limiting example, the analysis module 240 generates data structures for member profiles using profile features extracted from the member profiles. In this example, the analysis module 240 determines the profile similarity score between member profiles by comparing the generated data structures for respective member profiles.

In various embodiments, the analysis module 240 performs various functions to prepare or condition the profile data for analysis. For instance, the analysis module 240 standardizes the profile data to facilitate analysis of the profile data (e.g., determine a normal or canonical form for the data to allow for comparison and other mathematical analysis). Standardization (also referred to as canonicalization), as used herein, is intended to include generating and/or determining a standardized form of a feature, attribute, characteristic, or other information. For instance, a particular feature, attribute, characteristic, or piece of information may be similar or intended to be similar to another attribute characteristic or piece of information. In this instance, standardizing the information results in generating a standard form (also referred to as normal form) that reduces a variety of similar representations of the information to a standardized form. For a specific example, various pieces of information may be referring to a single street name (e.g., "market street," "Market st.," or "Market ST"). Standardizing the street name may result in standardized form (e.g., "Market St.") that may represent multiple similar forms. Standardizing a set of features, attributes, characteristics, or other information provides more accurate direct comparisons between standardized forms of information and allows for more accurate mathematical analysis as similar information or information that is intended to be similar may be grouped together. The analysis module 240 can employ a variety of schemes and techniques to perform standardization.

Figure 3:
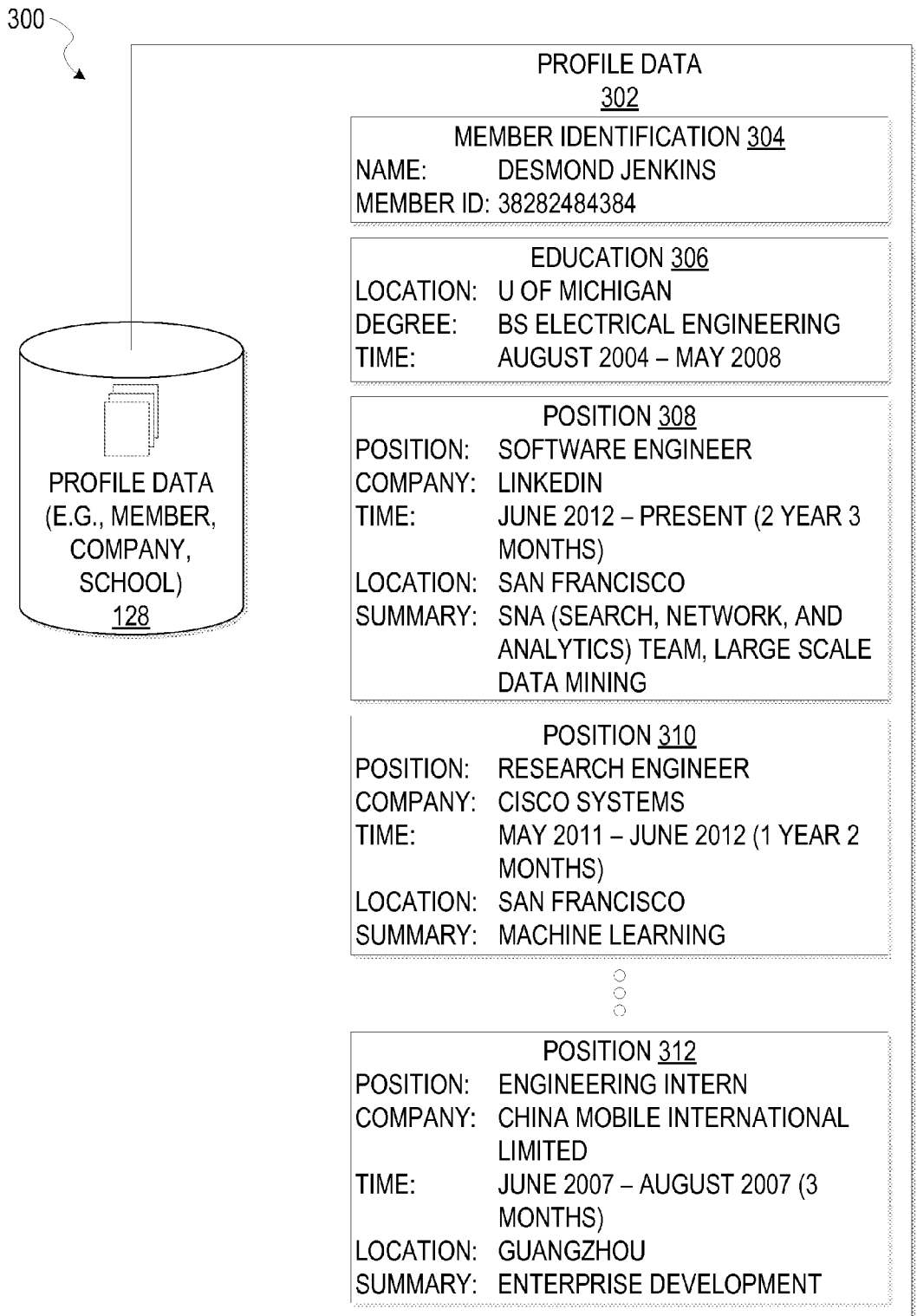
FIG. 3 is a block diagram illustrating example profile data, according to some example embodiments.

FIG. 3 is a block diagram 300 illustrating example profile data, according to some example embodiments. As discussed above, the database 128 includes profile data corresponding to a plurality of members of the social network service. In the example of FIG. 3, profile data 302 includes data pertaining to a particular member (member identification 304) of the social network service such as educational history of the particular member (education 306), a current position/job (position 308) or past positions/jobs (position 310 and position 312), and so forth. In some embodiments, the analysis module 240 parses the profile data 302 into profile features, characteristics, or attributes corresponding to the particular member of the social network service. In an example, a particular profile feature can comprise a particular position held by the particular member of the social network server. In various embodiments, the profile features, characteristics, or attributes respectively correspond to pieces of the temporal data included in the profile data 302 such as a position start time, position end time, position duration, and so on.

Figure 4:
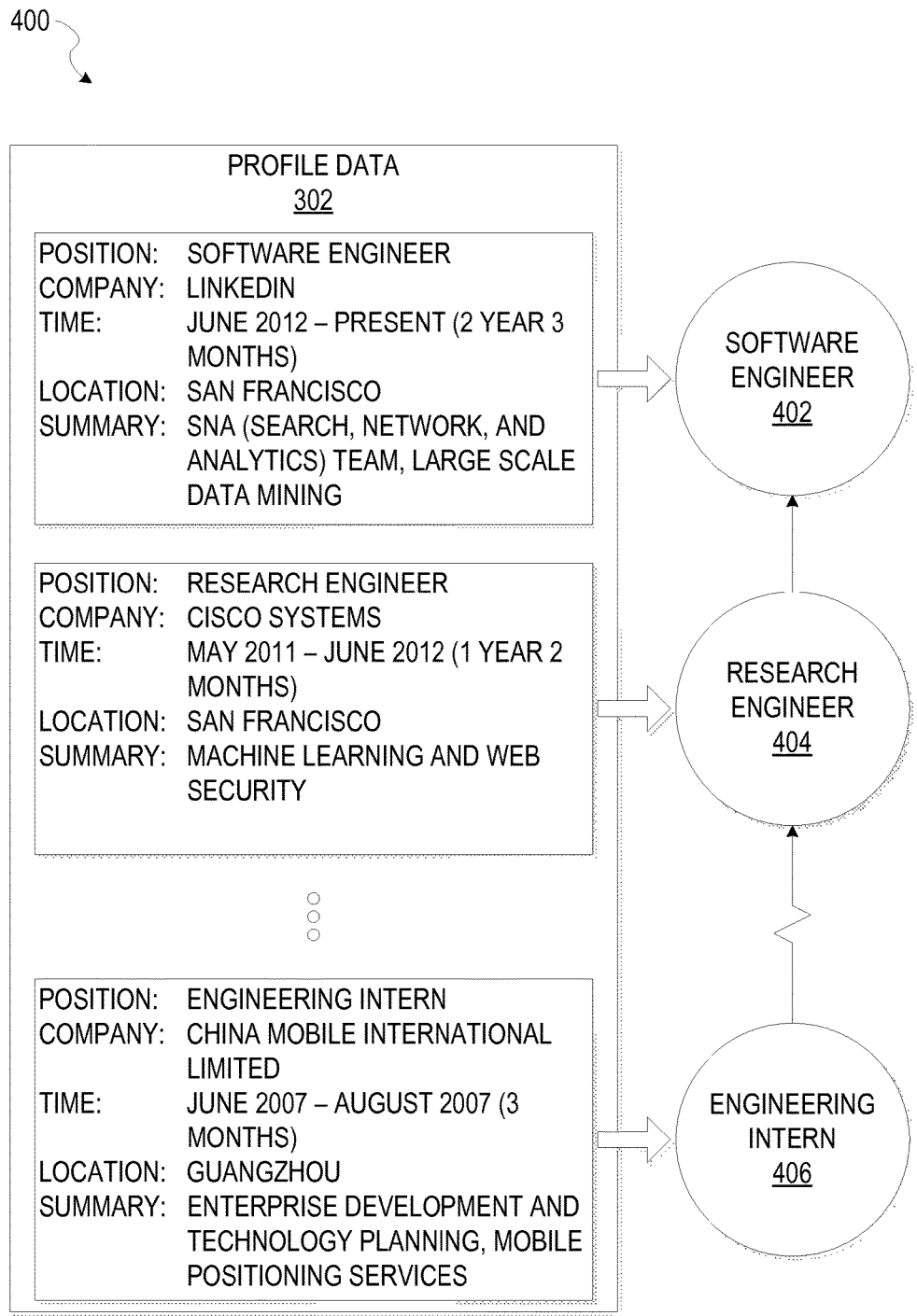
FIG. 4 is a block diagram illustrating an example of generating a data structure using profile data, according to some example embodiments.

FIG. 4 is a block diagram 400 illustrating an example of generating a data structure using profile data, according to some example embodiments. In the example of FIG. 4, the analysis module 240 extracts the profile features from the profile data 302 that corresponds to a particular member of the social network service. In this example, the profile features comprise positions held by the particular member of the social network service. The analysis module 240 generates nodes 402, 404, and 406 to include one or more of the profile features, attributes, or characteristics. For instance the node 402 includes the current position held by the particular member of the social network service. Once the analysis module 240 generates the nodes, the analysis module 240 assembles the node sequence comprising the nodes. In the example of FIG. 4, the analysis module 240 assembled the nodes 402, 404, and 406, each including a particular position held by the particular member of the social network service, into a sequence of nodes ordered by the temporal data corresponding to respective nodes 402, 404, and 406. In this way, the analysis module 240 generates the data structure using the profile data 302. Although the example of FIG. 4 is concerned with positions held by the particular member of the social network service, other profile features, characteristics, or attributes can be included or omitted in the nodes 402, 404, and 406.

Figure 5:
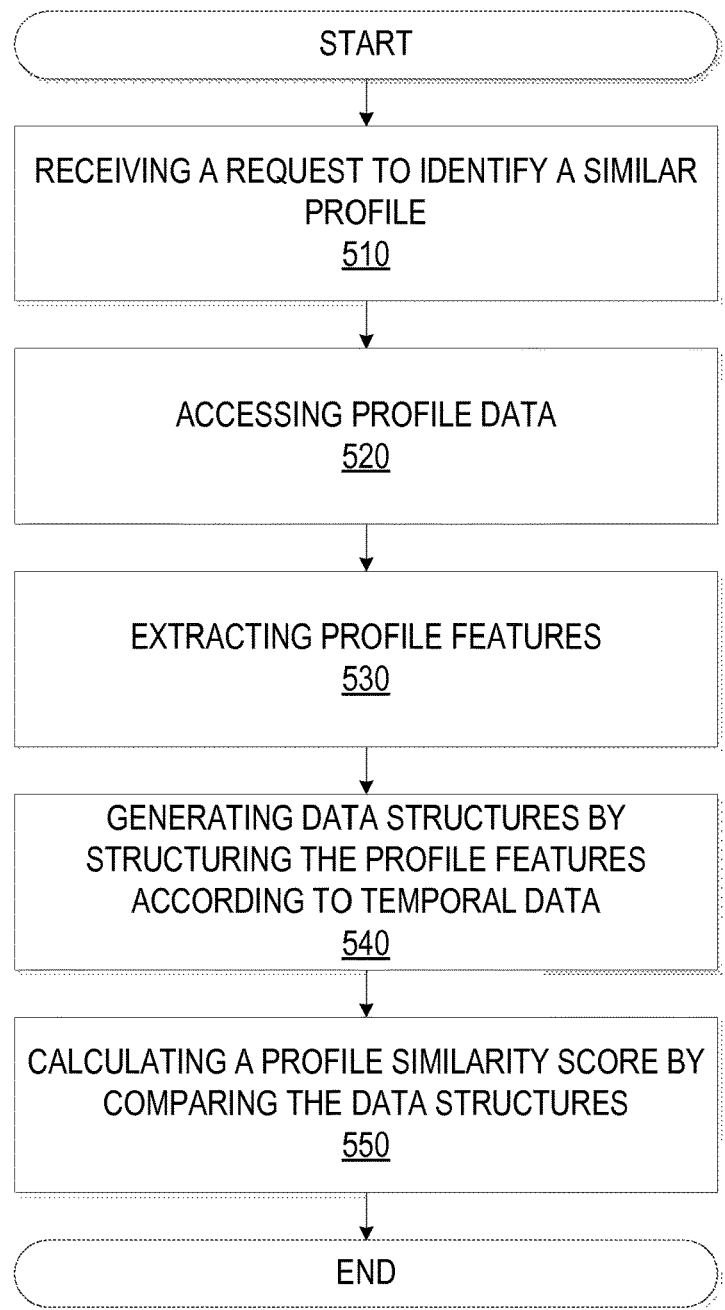
FIG. 5 is a flow diagram illustrating an example method for calculating a profile similarity score, according to some example embodiments.

FIG. 5 is a flow diagram illustrating an example method 500 for calculating the profile similarity score. The operations of method 500 can be performed by components of the profile similarity system 200.

At operation 510, the communication module 220 receives a request to identify one or more similar profiles, from among a plurality of candidate profiles of the social network service, that are similar to the source profile. In other words, the request is to identify one or more candidate profiles from the social network service that are similar to the source profile. In various embodiments, the request indicates the source member profile (e.g., the request includes a member identifier that identifies the source member profile). In other embodiments, the request does not indicate a particular member profile as the source profile, but rather includes search parameters (e.g., a position, a time period for the position, an education level, a seniority level) that the analysis module 240 uses to identify the source profile. In some embodiments, the request is received in response to a user initiation of the request. For example, the user provides input to a user interface, at the user device, indicating the source profile (e.g., the user browsing profiles on the social network service and designating one as the source profile).

At operation 520, the data module 230 accesses the profile data (e.g., profile data 302) of various member profiles from the social network service. The profile data includes profile data of the source profile and at least one candidate profile. As there are potentially numerous candidate profiles, the data module 230 can, in some embodiments, identify a set or pool of candidate profiles from which to perform further analysis. For instance, other similarity schemes, such as keyword-based profile similarity, can be employed (e.g., via the analysis module 240) to identify the pool of candidate profiles. In some embodiments, the data module 230 uses candidate criteria to identify the pool of candidates. For instance, the candidate criteria include a particular keyword or profile feature used by the data module 230 to identify member profiles to include in the pool of candidate profiles. In an example, the candidate criteria include a capability to work in a particular geographic region (e.g., citizenship-based criteria), a particular skill designated by the user, a particular certification or other qualification to perform a particular task (e.g., licenses to practice law in a particular state), and so on.

At operation 530, the analysis module 240 extracts profile features, characteristics, or attributes from the profile data. The profile features include source features extracted from the profile data of the source profile and candidate features extracted from the profile data of the candidate profile. In various embodiments, respective profile features of the extracted profile features correspond to pieces of the temporal data included in the profile data. That is to say, each of the profile features can correspond to a piece of the temporal data included in the profile data (e.g., a start date for a position profile feature).

In some embodiments, the analysis module 240 extracts the profile features from the profile data by parsing the profile data into pieces of the profile data and identifying certain pieces of the profile data as profile features (e.g., text inputted for a job title). In further embodiments, the analysis module 240 infers or derives profile characteristics, attributes, or features from the profile data. For instance, the analysis module 240 can infer a geographic location, for a particular time period, based on a geographic location of a particular entity or institution indicated by the profile data. The analysis module 240 can infer many other profile characteristics, attributes, or features from the profile data using a variety of schemes and techniques.

At operation 540, the analysis module 240 generates data structures by structuring the profile features according to the temporal data. The data structures include a source data structure generated using the source features and a candidate data structure generated using the candidate features. As will be discussed below in connection with FIG. 6 and FIG. 7, in some embodiments, the data structures comprise node sequences that include a plurality of nodes. Respective nodes of the plurality of nodes include at least one of the extracted profile features. In various embodiments, the analysis module 240 temporally orders the nodes of the node sequences.

At operation 550, the analysis module 240 calculates the profile similarity score by comparing the candidate data structure with the source data structure. The profile similarity score indicates the similarity between the candidate profile and the source profile. In an example, the profile similarity score comprises a value where a higher value indicates a stronger similarity between the source profile and the candidate profile. As discussed below in connection with FIG. 19, in some embodiments, the analysis module 240 uses the similarity score to identify the one or more candidate profiles that are similar to the source profile (e.g., the similarity score exceeding a threshold value). In some embodiments, the presentation module 210 causes presentation of the identified similar profiles and, in some instances, an indication of the profile similar score corresponding to respective identified similar profiles.

Figure 6:
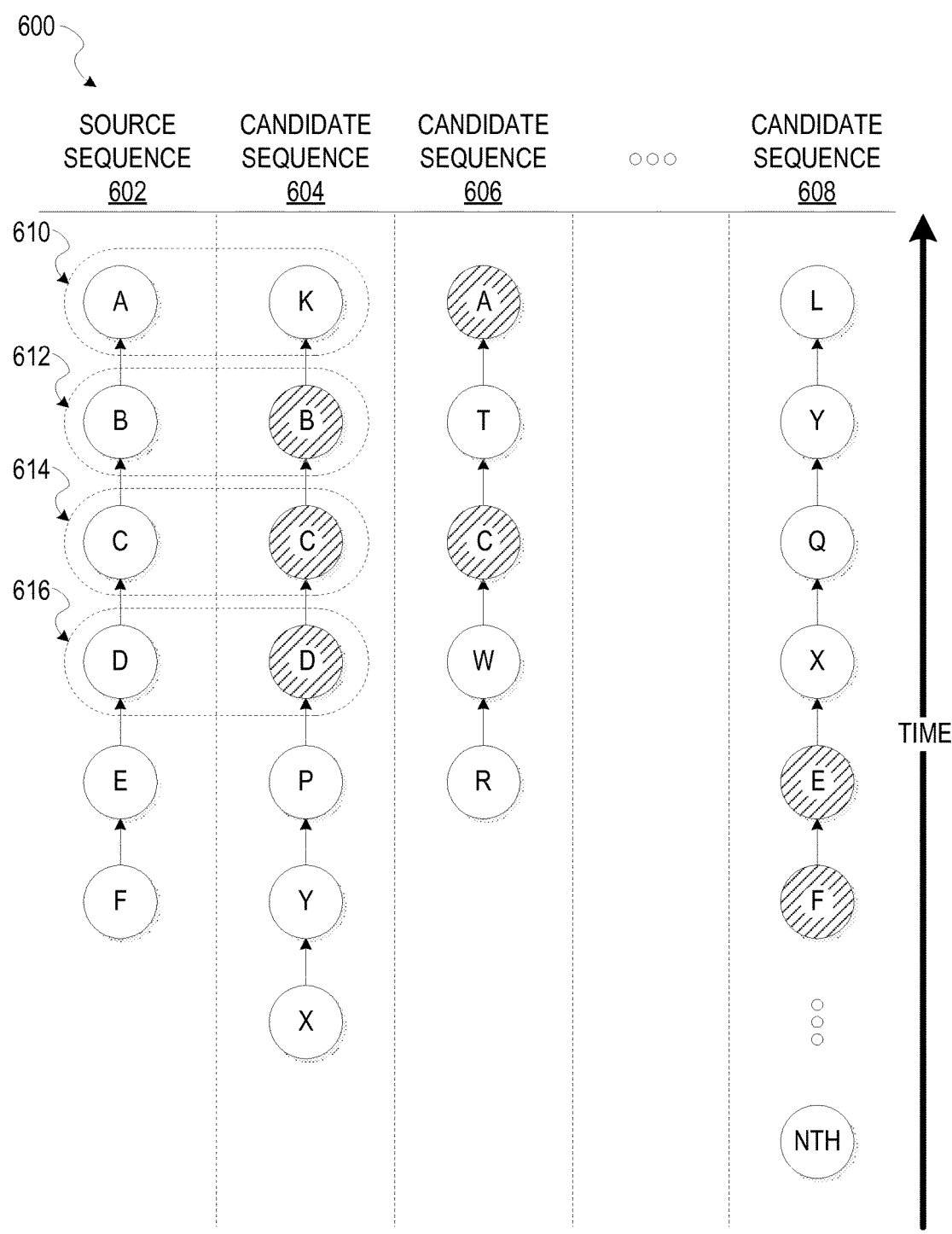
FIG. 6 is a block diagram illustrating an example of calculating a profile similarity score using data structures, according to some example embodiments.

To help illustrate the operation 550 discussed above, FIG. 6 is a block diagram 600 illustrating an example of calculating the profile similarity score using data structures. The block diagram 600 shows a source sequence 602, candidate sequence 604, candidate sequence 606, and candidate sequence 608. Although FIG. 6 shows three candidate sequences 604, 606, 608, the analysis module 240 can compare any number of candidate sequences to the source sequence. Each of the sequences 602, 604, 606, and 608 include a plurality of nodes structured according to the temporal data. For instance, the source sequence 602 comprises nodes A-F. In this instance, the node A of source sequence 602 is a most recent employment position of the source profile and node F is a furthest in the past employment position of the source profile. As shown in the candidate sequence 608, a particular node sequence can comprise any number of nodes (e.g., the candidate sequence 608 starting at node L and extending to an nth node).

In various embodiments, each of the node sequences includes nodes with profile features extracted from a particular member profile of the social network service. For example, the source sequence 602 comprises the nodes A-F which each include various profile features extracted from a single member profile of the social network service. Similarly, the node sequences 604, 606, and 608 each comprise nodes associated with other member profiles of the social network service.

The analysis module 240 compares the source sequence 602 with the candidate sequence 604 by performing a node-wise comparison between the source sequence 602 and the candidate sequence 604 (e.g., comparing the nodes included in each of the node sequences 602 and 604). For instance, the analysis module 240 makes comparison 610 between node A of the source sequence 602 and node K of the candidate sequence 604. Similarly, the analysis module 240 makes comparisons 612, 614, and 616 between nodes B, C, and D of source sequence 602 and nodes B, C, and D of candidate sequence 604. As illustrated in FIG. 6 by the shading and corresponding letters, nodes of the source sequence 602 can be similar to nodes of various candidate sequences. For example, the node A of source sequence 602 is not as similar to the node K of the candidate sequence 604 as node B of the source sequence 602 and node B of candidate sequence 604. In an example embodiment, the analysis module 240 calculates a node similarity score for each of the comparisons 610, 612, 614, and 616. The node similarity score is a value that indicates the similarity between two nodes. A higher value indicates a stronger similarity between nodes of a particular comparison.

In various embodiments, the analysis module 240 calculates the profile similarity score by combining the node similarity scores resulting from the comparisons 610, 612, 614, and 616. For example, source sequence 602 has three nodes (the nodes B, C, and D of the source sequence 602) that are similar to the nodes of the candidate sequence 604.

In this example, the analysis module 240 calculates a higher similarity score for the candidate sequence 604 than another candidate sequence with fewer or no similar nodes. As will be discussed below, other factors can influence how the analysis module 240 calculates the profile similarity score between the source profile and the candidate profile using a temporally ordered sequence of nodes.

Referring now to FIG. 7, a flow diagram illustrating an example method for assembling a node sequence is shown. As discussed above, at the operation 540, the analysis module 240 generates the data structures by structuring the profile features according to the temporal data corresponding to respective profile features. In various embodiments, the operation 540 includes the operations of FIG. 7.

At operation 710, the analysis module 240 generates the plurality of nodes using the profile features extracted from a particular member profile. Respective nodes of the plurality of nodes include at least one of the profile features of the particular member profile. In an example, each node of the plurality of nodes includes an employment position extracted from the particular member profile. As will be discussed in connection with FIG. 8 below, each of the nodes of the plurality of nodes can also include profile features corresponding to the employment position of each node. In some embodiments, each node of the plurality of nodes includes a same type of profile features (e.g., an employment position being a type of profile feature) allowing for simplistic comparisons between nodes.

At operation 720, the analysis module 240 orders the plurality of nodes sequentially according to the temporal data. For instance, if respective nodes of the plurality of nodes comprise an employment position extracted from the particular member profile, the employment position corresponds to temporal data from the particular member profile such as a starting date or ending date of the employment position. In this instance, the analysis module 240 orders the plurality of nodes according to the starting date of the respective nodes of the plurality of nodes. In some embodiments, the analysis module 240 orders the nodes according to a same type of temporal data (e.g., the starting date of the employment position being a type of temporal data) for consistent temporal ordering across the plurality of nodes.

In further embodiments, the analysis module 240 infers the temporal data for a particular node of the plurality of nodes. For instance, if no temporal data for the particular node is available from the particular member profile, the analysis module 240 infers the temporal data for the particular node based on, for example, the order in which the employment position is listed in the profile data or other temporal cues indicated by the profile data.

At operation 730, the analysis module 240 assembles the node sequence with the ordered plurality of nodes. For instance, the analysis module 240 assembles the node sequence to comprise nodes corresponding to employment positions ordered starting with a most recent employment position and ending with a furthest in the past employment position.

FIG. 8 is a flow diagram illustrating an example method for generating a node that includes profile features. As discussed in connection with FIG. 7, at the operation 710, the analysis module 240 generates the plurality of nodes using the profile features of a particular member profile. In various embodiments, the operation 710 includes the operations of FIG. 8.

At operation 810, the analysis module 240 identifies an employment position from the particular member profile. For example, the particular member profile includes position entries (e.g., entries inputted by a member of the particular member profile) of current and previous employment positions. The employment entries includes data such as job title, company, salary, location, start date, end date, seniority level, achievements, position skills, position duties, position responsibilities, position activity, and so forth. In an example, the analysis module 240 identifies the employment position based on the text inputted for the job title.

At operation 820, the analysis module 240 associates a particular node with the employment position. For instance, a particular node of the plurality of node includes the identified employment position.

At operation 830, the analysis module 240 includes profile features corresponding to the identified employment position in the node. For example, the analysis module 240 includes employment data such as seniority level, location, company, and so on, extracted from a particular position entry of the particular member profile. In this way, each node of the plurality of nodes includes a particular employment position from the particular member profile and includes various data corresponding to the particular employment position from the particular member profile.

Figure 9:
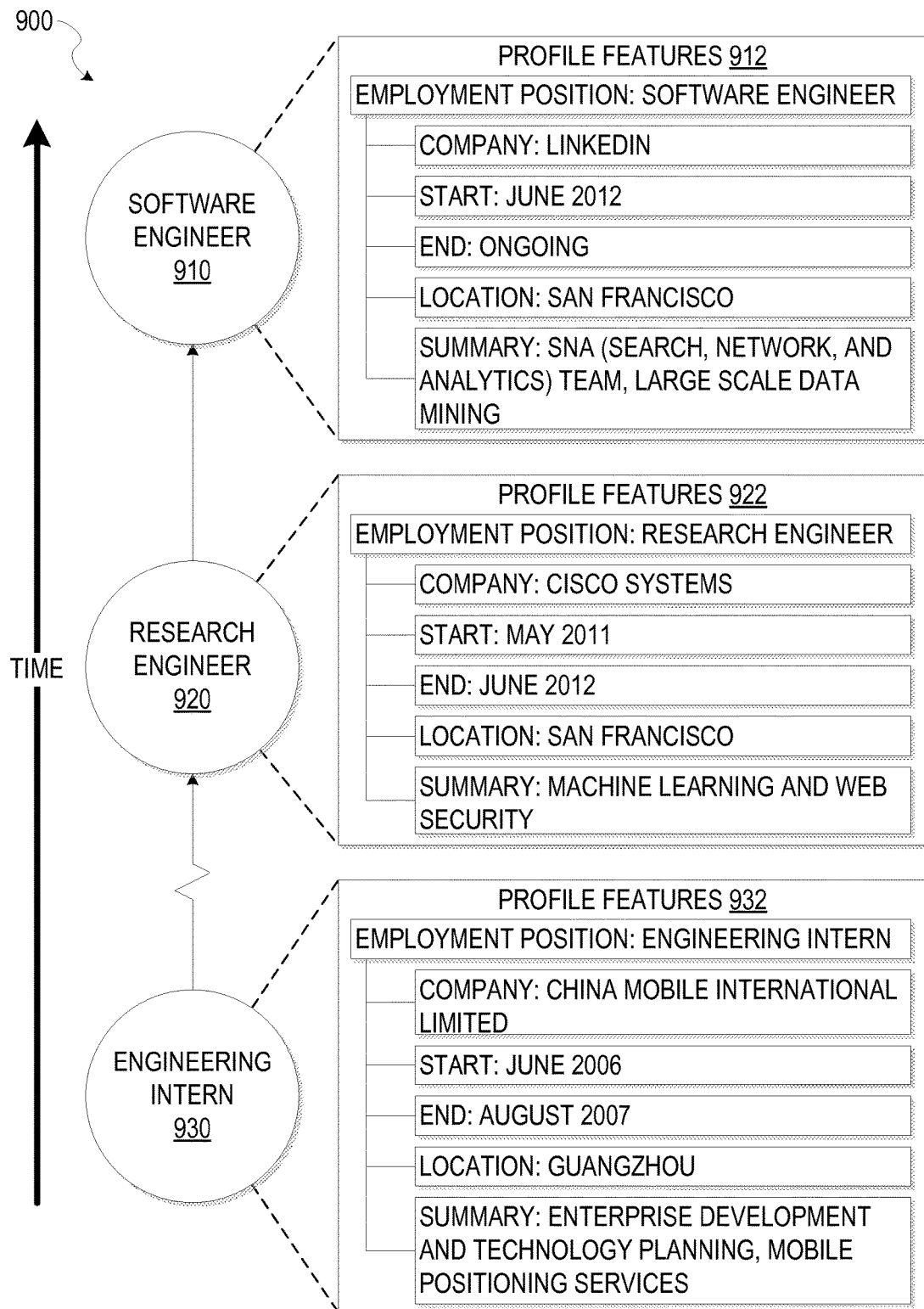
FIG. 9 is a block diagram illustrating an example node sequence that includes nodes associated with various profile data, according to some example embodiments.

To further illustrate the method of FIG. 8, FIG. 9 is a block diagram 900 illustrating an example node sequence that includes nodes associated with various profile data. The example node sequence of FIG. 9 includes nodes 910, 920, and 930. In this example, the node 910 is associated with a software engineer employment position. The node 910 includes profile features 912 corresponding to the employment position of the node 910. The profile features 912 include, for example, position data such as title, company, location, start date, end date, position skills, and so forth. Similarly, the nodes 920 and 930 respectively include profile features 922 and 932 corresponding to a research engineer employment position and an engineering intern employment position. In other words, each of the nodes 910, 920, and 930 respectively include profile features corresponding to the employment position included in the respective nodes 910, 920, and 930.

Figure 10:
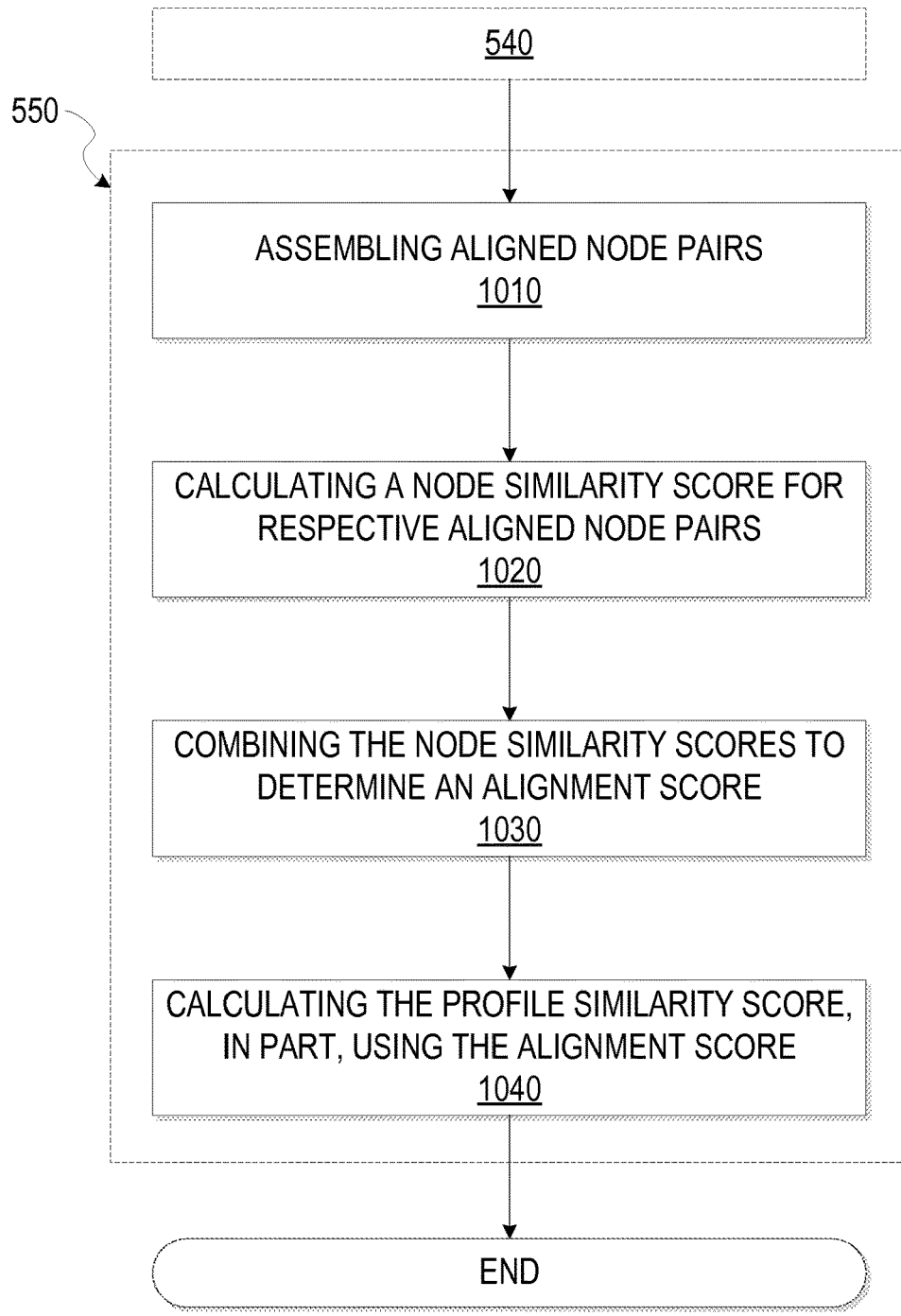
FIG. 10 is flow diagram illustrating an example method for calculating a profile similarity score by comparing data structures, according to some example embodiments.

Referring now to FIG. 10, a flow diagram illustrating further operations for calculating the profile similarity score by comparing the data structures is shown. As discussed above, at the operation 550, the analysis module 240 calculates the profile similarity score by comparing data structures. In various embodiments, the operation 550 includes the operations of FIG. 10.

At operation 1010, the analysis module 240 assembles aligned node pairs by aligning the candidate data structure with the source data structure. Respective aligned node pairs include a node from the candidate data structure and a node from the source data structure.

At operation 1020, the analysis module 240 calculates a node similarity score for respective aligned node pairs. In some embodiments, the analysis module 240 calculates the node similarity score for a particular aligned node pair by comparing profile features of the node from the candidate data structure and profile features of the node from the source data structure. In an example, standardized forms of the profile features of the node from the candidate data structure are matched with the profile features of the node from the source data structure. In this example, more matching, or nearly matching, profile features between nodes results in a higher node similarity score. In another example, the analysis module 240 uses cosine-similarity to calculate the node similarity score.

In further example embodiments, the analysis module 240 determines the node similarity score using a prediction model. For instance, the prediction model can comprise any one of a logistic regression model, a Naïve Bayes model, a support vector machines (SVM) model, a decision trees model, a neural network model, other machine learning models, or another type of model.

In some embodiments, the prediction model uses training data including positive training data and negative training data. In these embodiments, the training data can be based on, for example, a profile search for member profiles similar to another profile performed by a particular user of the social network service. In a further example, the positive training data can be based on contacted member profiles included in the member profile search results, the contacted member profiles being contacted by the particular user of the social network service. In some embodiments, the negative training data can be based on non-contacted member profiles included in the member profile search results, the non-contacted member profiles being those not contacted by the particular user of the social network service.

In various embodiments, the analysis module 240 calculates the node similarity score for a predetermined number of aligned node pairs. In an example, the analysis module 240 calculates the node similarity score for four, or any number, of the most recent aligned node pairs, the reasoning being that more recent employment positions are more relevant to a particular user seeking a similar profile. In other example embodiments, the analysis module 240 calculates the node similarity score for a dynamically determined number of aligned nodes pairs. For instance, if the source node sequences include many nodes, the analysis module 240 calculates the similarity score for a larger number of aligned node pairs. Conversely, if the source node sequence has very few nodes, the analysis module 240 calculates the node similarity score for fewer nodes.

At operation 1030, the analysis module 240 combines the node similarity score to determine an alignment score. In an example embodiment, the alignment score comprises a sum of the node similarity scores for several of the aligned node pairs.

At operation 1040, the analysis module 240 calculates the profile similarity score, in part, using the alignment score. In some instances, the profile similarity score is simply the alignment score. In other instances, the analysis module 240 calculates the profile similarity score using the alignment score and other factors.

Figure 11:
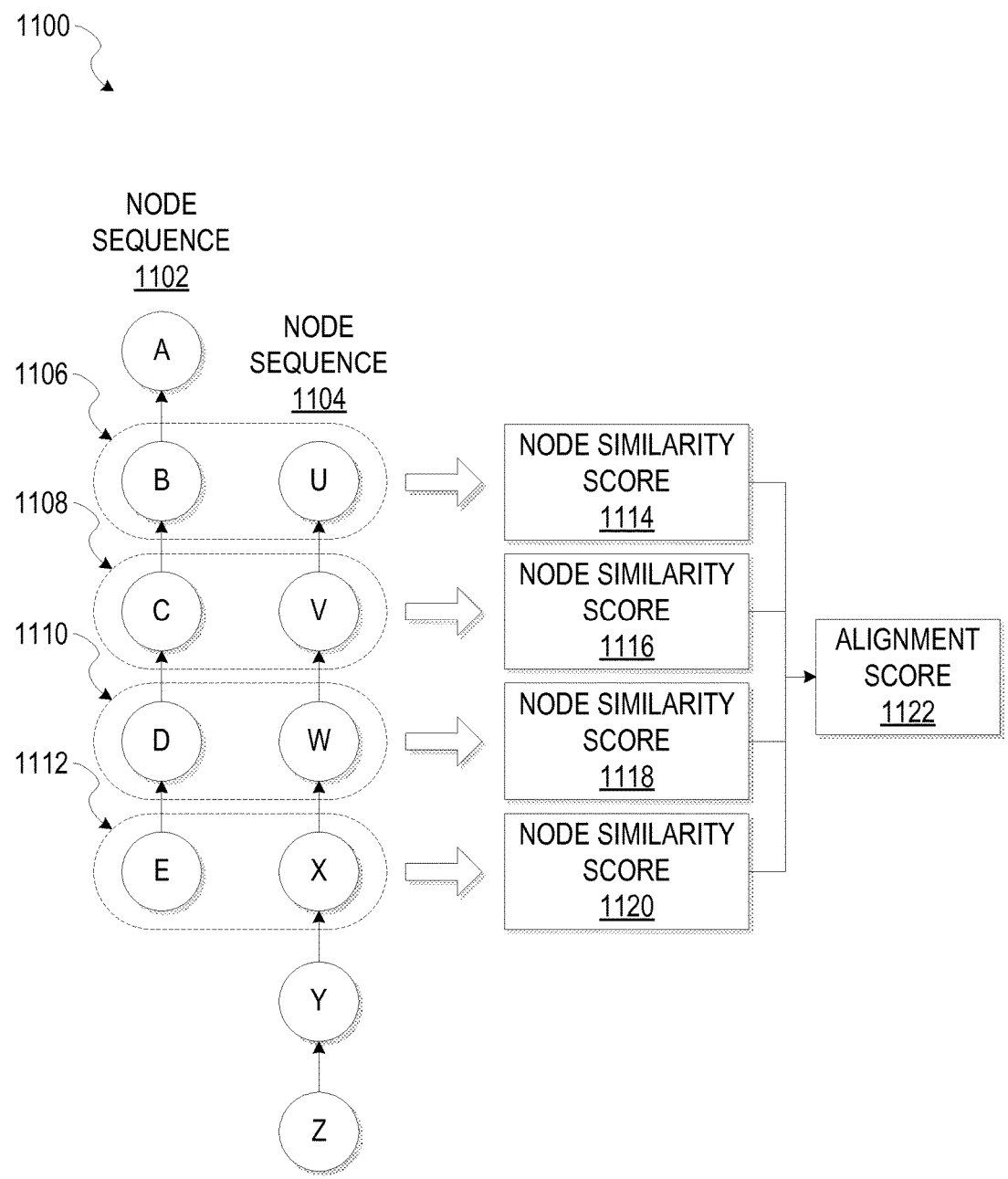
FIG. 11 is a block diagram illustrating an example of calculating a similarity score by comparing data structures, according to some example embodiments.

To help illustrate the operation of FIG. 10, FIG. 11 is a block diagram 1100 illustrating an example of calculating a similarity score by comparing data structures. In the block diagram 1100, node sequence 1102 comprises nodes A-F and node sequence 1104 comprises nodes U-Z. As described above in connection with FIG. 10, the analysis module 240 calculates the alignment score for a particular alignment by comparing nodes of two node sequences. In the example of FIG. 11, the analysis module 240 makes comparisons 1106, 1108, 1110, and 1112 between nodes B, C, D, and E of node sequence 1102 and nodes U, V, W, and X of node sequence 1104 respectively. For instance, the analysis module 240 calculates node similarity score 1114 based on the comparison 1106. Similarly, the analysis module 240 calculates node similarity scores 1116, 1118, 1120 based on comparisons 1108, 1110, and 1112 respectively. After the analysis module 240 calculates the node similarity scores, the analysis module 240 combines the node similarity scores to calculate the alignment score 1122 for a particular alignment between the node sequence 1102 and the node sequence 1104.

FIG. 12A is a flow diagram illustrating an example method for calculating the node similarity score using a weighting factor. As discussed above, at the operation 540, the analysis module 240 generates the data structures by structuring the profile features according to the temporal data corresponding to respective profile features. In various embodiments, subsequent to the operation 540, the operations of FIG. 12A are performed.

At operation 1210, the analysis module 240 derives at least one of a duration feature and a recentness feature using the temporal data. In an embodiment, the recentness feature represents a period of time (e.g., number of days, months, years, or other unit of time) from the present that a particular employment position was held. In an example, the recentness feature indicates that a particular employment position was held a year ago or is currently held.

In an embodiment, the duration feature represents the duration of a particular employment position. For instance, the duration feature is a period of time (e.g., number of days, months, years, or other unit of time) that the particular employment position has been held. The analysis module 240 derives the duration features using the profile data corresponding to the particular employment position. For instance, if the profile data indicates a starting date and an ending date for the particular employment position, the analysis module 240 determines the duration feature based on a difference between the ending date and the starting date.

At operation 1220, the analysis module 240 determines a weighting factor based on at least one of the derived duration feature and the derived recentness feature. For example, more recent employment positions are more highly valued (e.g., more influential in determining similarity) than older employment positions. In this example, the weighting factor may be lower (e.g., less influence) for recentness features further in the past. That is to say, a particular recentness feature with a large value indicates a larger time period since the employment position was held and, in some examples, is associated with a lower weighting factor. In another example, a longer duration employment positions are often more significant than shorter duration employment positions. In this example, the weighting factor may be higher (e.g., more influential) for the longer duration employment positions and lower for shorter duration employment positions. In some embodiments, the analysis module 240 employs a half-life exponential decay in conjunction with a time period of the recentness feature or the duration feature to calculate the weighting factor.

At operation 1230, the analysis module 240 calculates the node similarity, in part, using the weighing factor. For instance, the analysis module 240 can use the weighting factor in calculating the node similarity score for a particular aligned node pair, the alignment score for a particular pair of node sequences, or elsewhere in the operations described herein. In some instances, the analysis module 240 uses the weighting factoring in conjunction with the predictive model described above in connection with FIG. 10.

To assist in understanding the operations of FIG. 12A above, FIGS. 12B and 12C are block diagrams further illustrating examples of calculating a node similarity score using a weighting factor. In FIGS. 12B and 12C, node size (e.g., a depicted radius of a particular node) is indicative of the weighting factor.

FIG. 12B depicts an example of the analysis module 240 calculating the weighting factor based on the recentness feature. In this example, node sequence 1240 (the source node sequence) comprises nodes A-F, node sequence 1250 (the candidate node sequence) comprises nodes U-Z, and aligned node pair 1252 includes the node B and the node V of node sequences 1240 and 1250 respectively. In an example embodiment, the weighting factor comprises a recentness difference term based on a difference between the derived recentness feature of the node B of the node sequence 1240 and the node V from the node sequence 1250. In another example embodiment, the weighting factor comprises a recentness sum based on a sum between the derived recentness feature of the node B of the node sequence 1240 and the node V from the node sequence 1250.

FIG. 12C depicts an example of the analysis module 240 calculating the weighting factor based on the duration feature. In this example, node sequence 1260 (the source node sequence) comprises nodes A-F, node sequence 1270 (the candidate node sequence) comprises nodes U-Z, and aligned node pair 1272 includes the node C and the node W of node sequences 1260 and 1270 respectively. In an example embodiment, the weighting factor comprises a duration difference term based on a difference between the derived duration feature of the node C of the node sequence 1260 and the node W from the node sequence 1270. In another example embodiment, the weighting factor comprises a duration sum based on a sum between the derived recentness feature of the node C of the node sequence 1260 and the node W from the node sequence 1270.

Figure 13B:
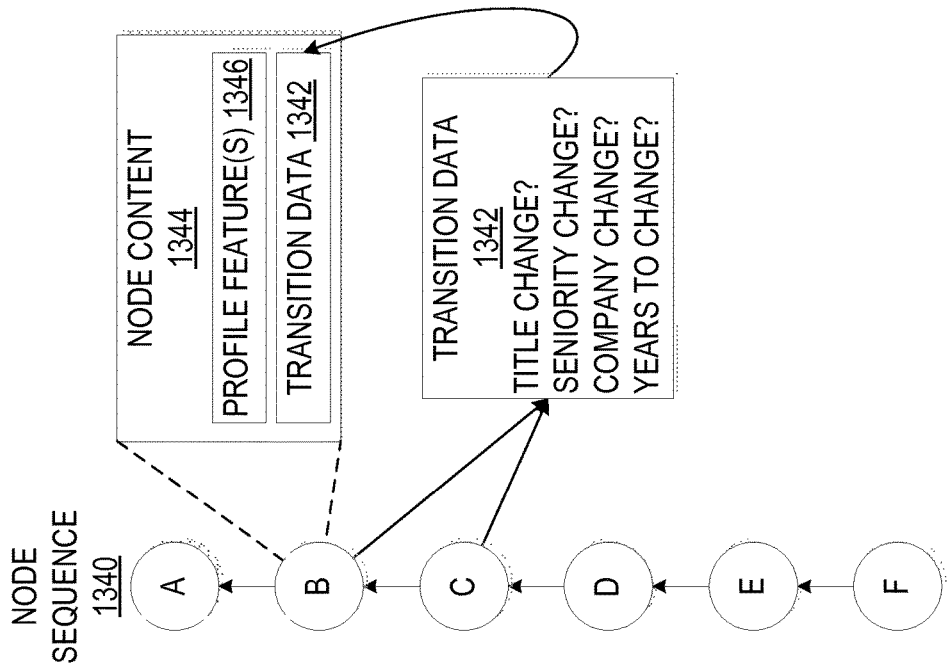
FIG. 13B is a block diagram illustrating an example of determining employment transition data, according to some example embodiments.
Figure 13A:
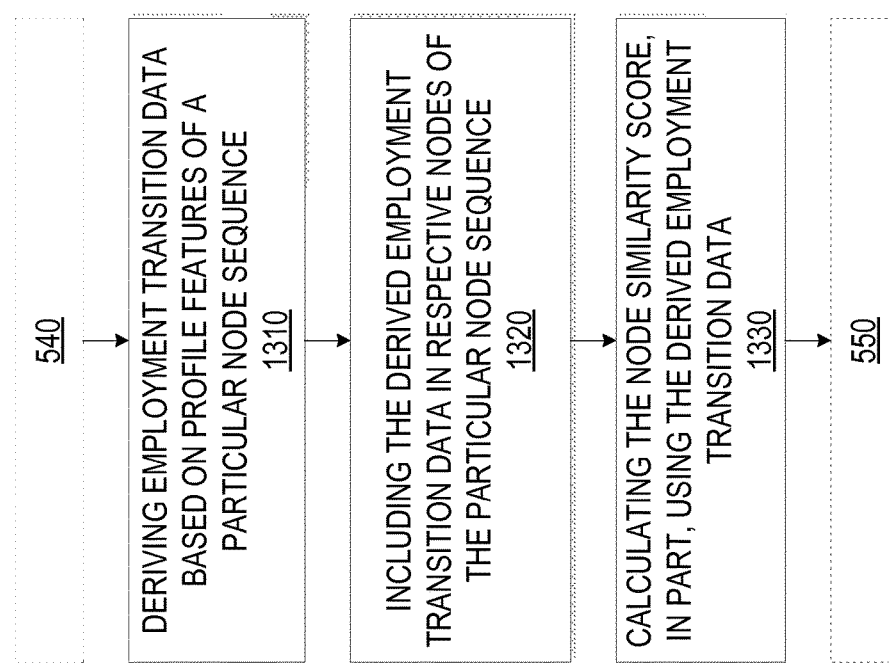
FIG. 13A is a flow diagram illustrating an example method for calculating a node similarity score using employment transition data, according to some example embodiments.

FIG. 13A is a flow diagram illustrating an example method for calculating the node similarity score using employment transition data. As discussed above, at the operation 540, the analysis module 240 generates the data structures by structuring the profile features according to the temporal data corresponding to respective profile features. In various embodiments, subsequent to the operation 540 the operations of FIG. 13A are performed.

At operation 1310, the analysis module 240 derives employment transition data based on the profile features of a particular node sequence. For example, the analysis module 240 compares the profile features of nodes included in the particular node sequence to derive the employment transition data. The employment transition data includes, for example, title change, company change, seniority change, period of time to complete transition, and so forth. In a specific example, the analysis module 240 compares the profile feature associated with an employment company for two consecutive nodes within the particular node sequence. In this example, the analysis module 240 determines whether the employment company is changed or unchanged between the two consecutive nodes.

At operation 1320, the analysis module 240 includes the derived employment transition data in respective nodes of the particular node sequence. For instance, title change, seniority change, company change, and a period of time to make the transition between a particular node and a prior consecutive node in a particular node sequence are included in the particular node.

At operation 1330, the analysis module 240 calculates the node similarity score, in part, using the derived employment transition data. For instance, the analysis module 240 uses the derived employment transition data in a similar manner to the profile features to calculate the node similarity score for a particular aligned node pair.

To further illustrate the concepts of FIG. 13A, FIG. 13B is a block diagram illustrating an example of determining the employment transition data. Node sequence 1340 includes nodes A-F. The analysis module 240 compares the profile features of the node B and the node C to derive the transition data 1342. Subsequently, the analysis module 240 includes the transition data 1342 in the node B. Thus, the node B corresponds to node content 1344 including profile features 1346 and the transition data 1342.

Figure 14:
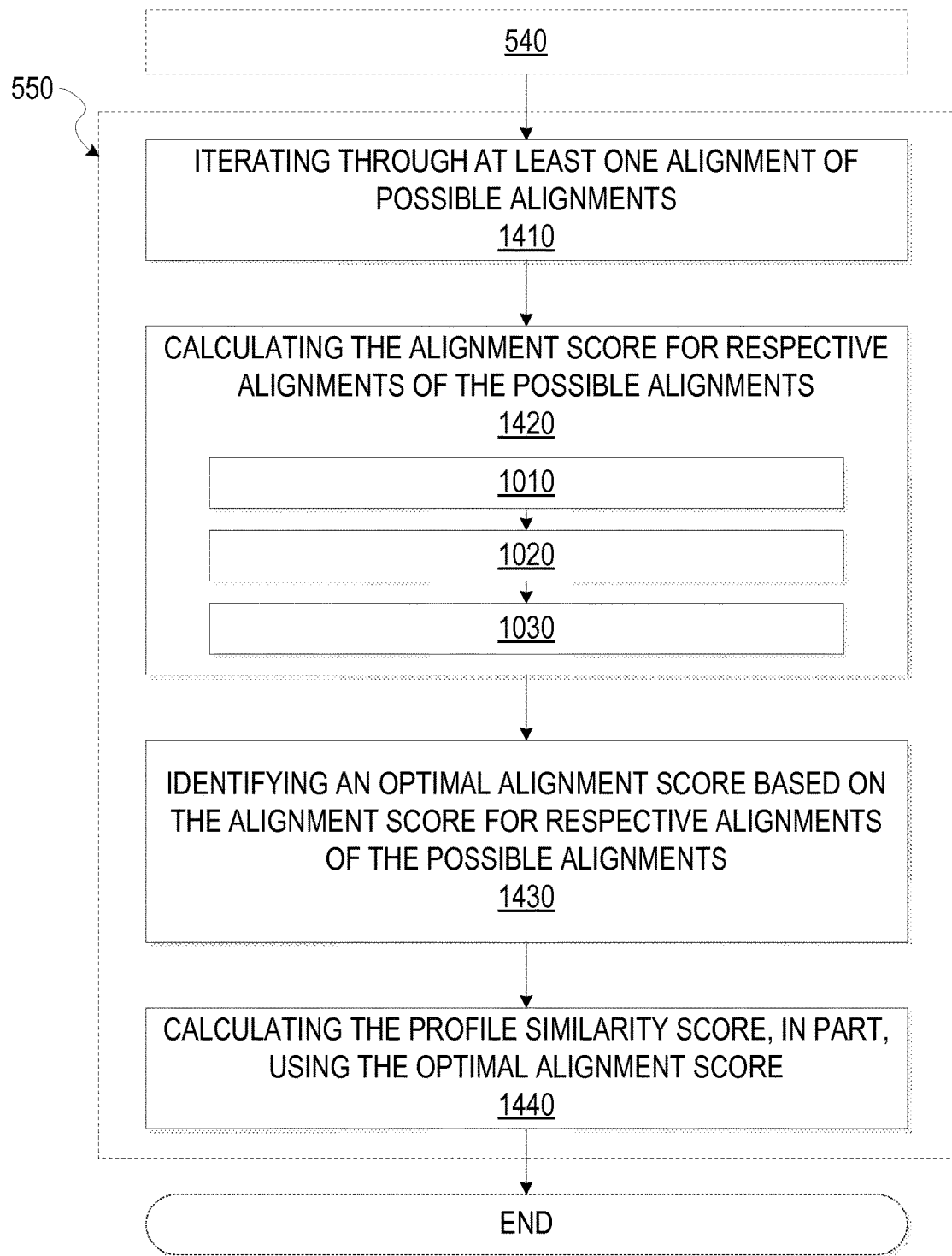
FIG. 14 is a flow diagram illustrating an example method for calculating an optimal alignment score, according to some example embodiments.

FIG. 14 is a flow diagram illustrating an example method for calculating an optimal alignment score, according to some example embodiments. As discussed above, at the operation 550, the analysis module 240 calculates the profile similarity score by comparing data structures. In various embodiments, the operation 550 includes the operations of FIG. 14.

At operation 1410, the analysis module 240 iterates through at least one alignment of possible alignments between the candidate data structure and the source data structure. The possible alignments include all, or some, of the alignment permutations that can be formed between the candidate data structure and the source data structure. In further embodiments, a pre-determined number of permutations may be iterated through. In still further embodiments, a predetermined type of alignment is iterated through. In yet further embodiments, alignment criteria are met prior to iterating through the alignment.

At operation 1420, the analysis module 240 calculates the alignment score for respective alignment of the possible alignment. As discussed above in connection with FIG. 10, in some embodiments, the analysis module 240 calculates the alignment score by assembling the aligned node pairs (the operation 1010), calculating a node similarity score for the respective aligned node pairs (the operation 1020), and combining the node similarity score (the operation 1030).

At operation 1430, the analysis module 240 identifies an optimal alignment score based on the alignment scores for respective alignments of the possible alignments. In an example embodiment, the optimal alignment score comprises a maximum alignment score (e.g., a highest alignment score) among the alignment scores for respective alignments of the possible alignments.

At operation 1440, the analysis module 240 calculates the profile similarity score using, in part, the optimal alignment score. Similar to the operation 1040, in some instances, the profile similarity score is simply the optimal alignment score. In other instances, the analysis module 240 calculates the profile similarity score using the optimal alignment score and other factors.

Figure 15:
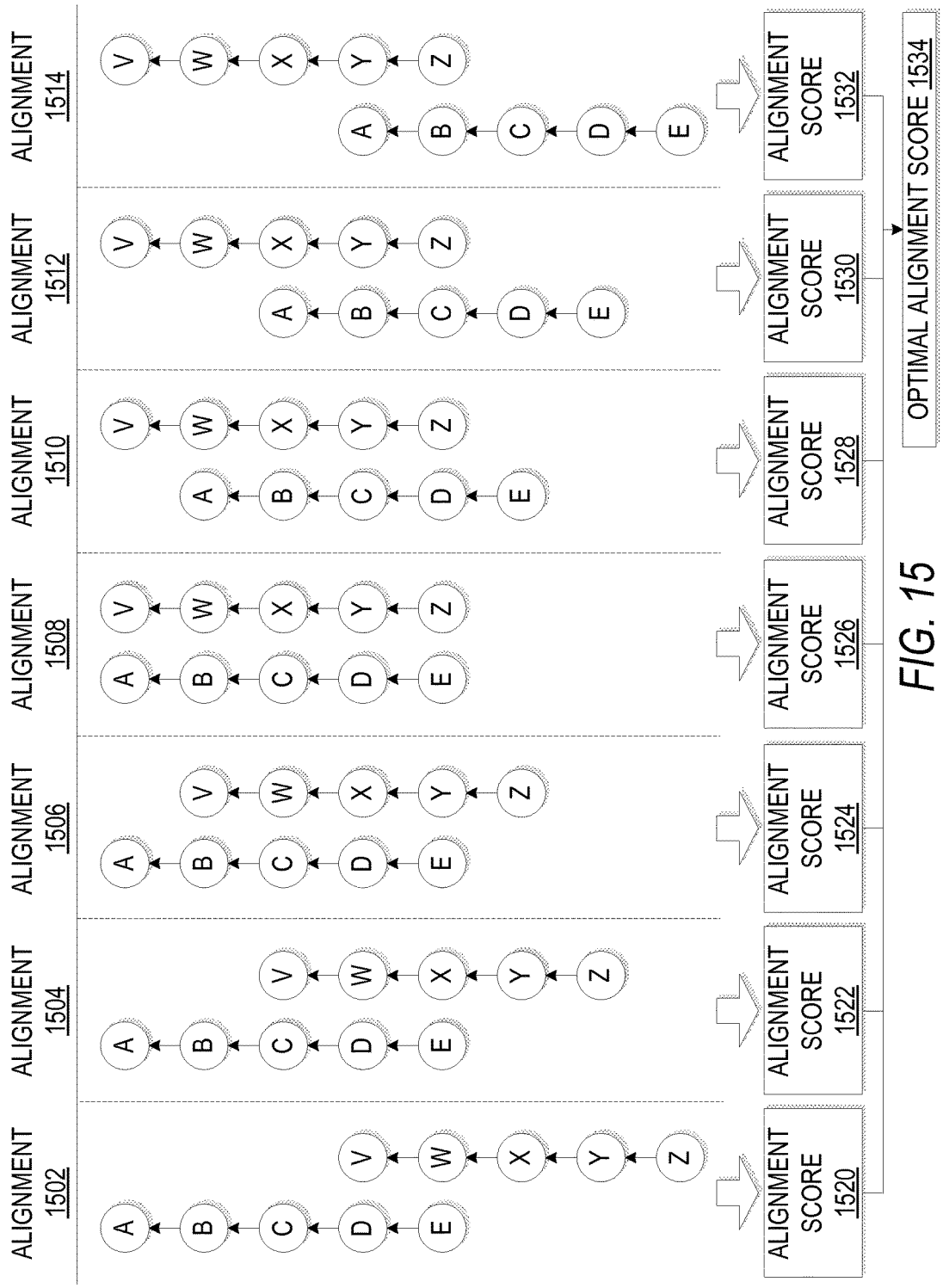
FIG. 15 is a block diagram illustrating an example of calculating an optimal alignment score, according to some example embodiments.

To illustrate the operations of FIG. 14, FIG. 15 is a block diagram illustrating an example of calculating the optimal alignment score. FIG. 15 includes example alignments 1502, 1504, 1506, 1508, 1510, 1512, and 1514 (other possible alignments not shown). As described in connection with FIG. 10 and FIG. 14 above, the analysis module 240 calculates alignment scores 1520, 1522, 1524, 1526, 1528, 1530, and 1532 respectively for the example alignments 1502, 1504, 1506, 1508, 1510, 1512, and 1514. Subsequently, the analysis module 240 calculates the optimal alignment score 1534 based on the alignment scores 1520, 1522, 1524, 1526, 1528, 1530, and 1532. For instance, the optimal alignment score 1534 comprises a higher alignment score among the alignment scores 1520, 1522, 1524, 1526, 1528, 1530, and 1532. In this way, the analysis module 240 calculates the optimal alignment score 1534 from various alignments among the possible alignments.

Figure 16B:
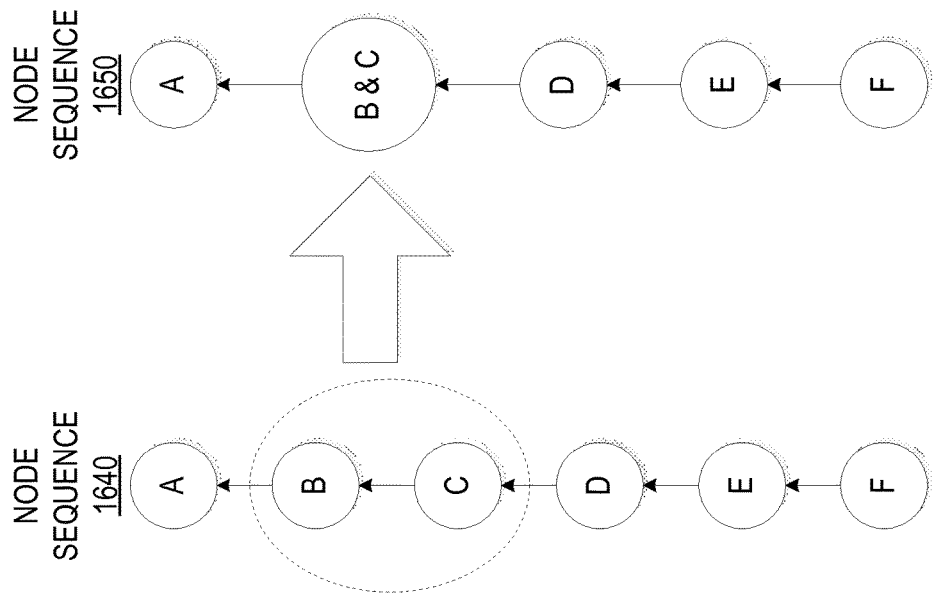
FIG. 16B is a block diagram further illustrating an example of merging similar nodes of a node sequence, according to some example embodiments.
Figure 16A:
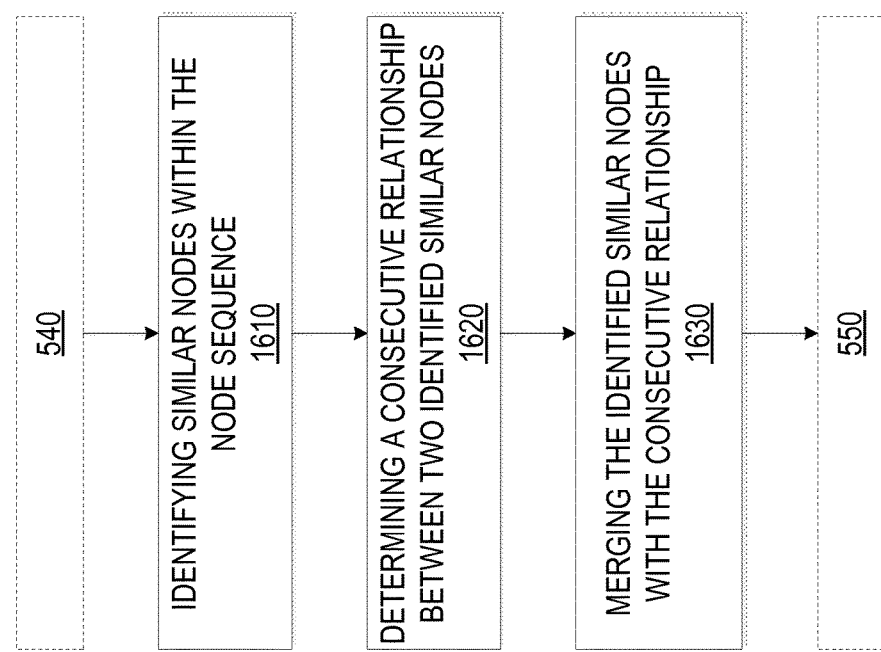
FIG. 16A is a flow diagram illustrating an example method for merging similar nodes, according to some example embodiments.

FIG. 16A is a flow diagram illustrating an example method for merging similar nodes. As discussed above, at the operation 540, the analysis module 240 generates the data structures by structuring the profile features according to the temporal data corresponding to respective profile features. In various embodiments, subsequent to the operation 540 the operations of FIG. 16A are performed.

At operation 1610, the analysis module 240 identifies similar nodes among the plurality of nodes included in the node sequence by comparing the profile features included in the respective nodes of the plurality of nodes. For instance, if two nodes in the node sequence are identical or nearly identical, those two nodes can be represented as a single node. In some embodiments, the analysis module 240 calculates a merge node similarity score similarity to the node similarity score described above. In these embodiments, if the analysis module 240 determines that the merge node similarity score exceeds a threshold, the analysis module 240 may proceed to merge the identified similar nodes.

At operation 1620, the analysis module 240 determines a consecutive relationship between two identified similar nodes. For instance, the consecutive relationship comprises two nodes that are immediately adjacent within the node sequence. In further embodiments, the analysis module 240 determines satisfaction of merge criteria prior to merging two nodes. For example, the merge criteria includes a minimum duration (e.g., nodes corresponding to employment positions with very short durations can be merged into similar consecutive nodes with larger durations), same position title, same seniority level, and so forth.

At operation 1630, the analysis module 240 merges the identified similar nodes with the consecutive relationship in the node sequence. In alternative embodiments, the analysis module 240 merges nodes without the consecutive relationship. In further embodiments, the analysis module 240 performs the operations of FIG. 16A multiple times. For instance, two nodes that were previously merged can be merged again with another node.

To help illustrate the concepts of FIG. 16A, FIG. 16B is a block diagram further illustrating an example of merging similar nodes of a node sequence, according to some example embodiments. Node sequence 1640 includes nodes A-F. In an example, the analysis module 240 determines that the nodes B and C are similar. Subsequently, the analysis module 240 merges the nodes B and C into a single node as shown in node sequence 1650.

Figure 17B:
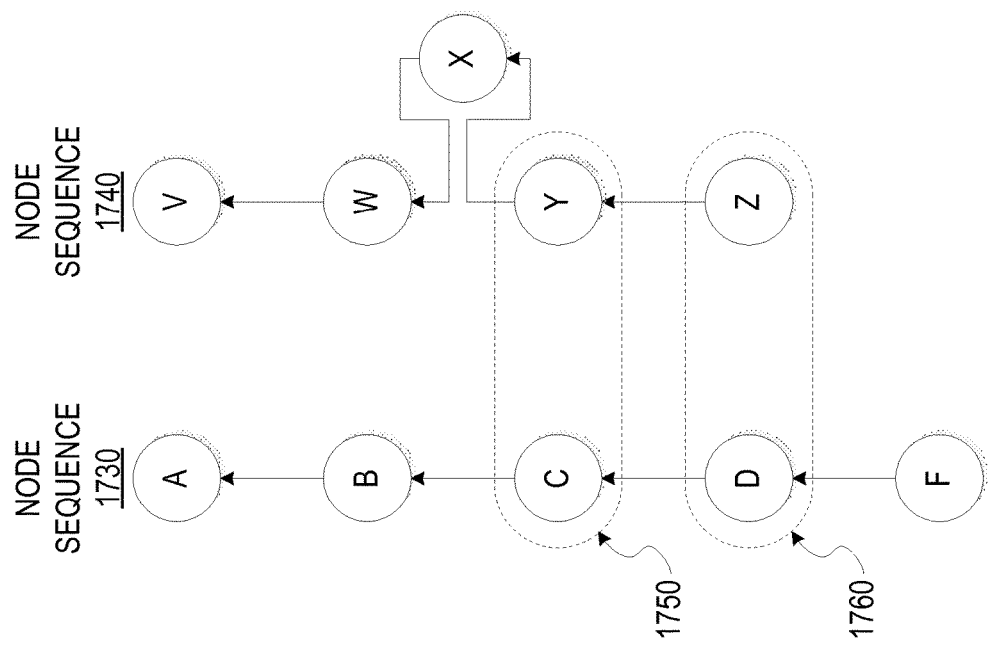
FIG. 17B is a block diagram further illustrating an example of skipping a node similarity score for a particular aligned node pair, according to some example embodiments.
Figure 17A:
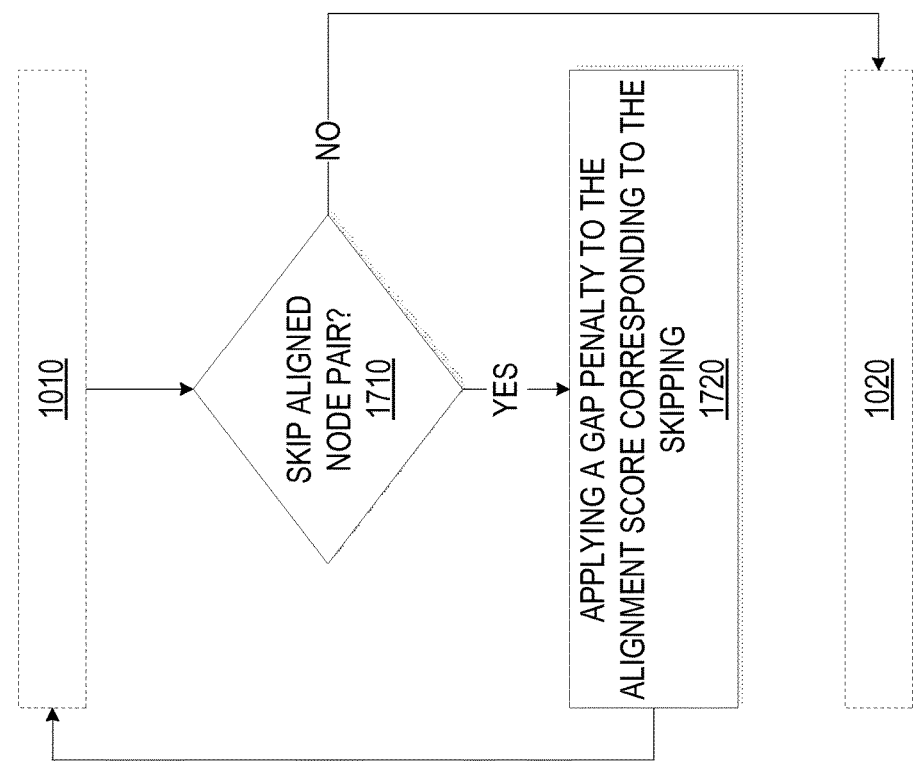
FIG. 17A is a flow diagram illustrating an example method for skipping a node similarity score for a particular aligned node pair, according to some example embodiments.

FIG. 17A is a flow diagram illustrating an example method for skipping a node similarity score for a particular aligned node pair. As discussed above, at the operation 1010, the analysis module 240 assembles the aligned node pairs for the source node sequence and the candidate node sequence. In various embodiments, subsequent to the operation 1010 the operations of FIG. 17A are performed.

At operation 1710, the analysis module 240 determines whether to skip calculating the node similarity score based on an analysis of the profile feature included in a particular aligned node pair. For example, if the analysis module 240 determines satisfaction of skip criteria, the analysis module 240 skips calculating the node similarity score for the particular aligned node pair. For instance, if the nodes included in the particular aligned node pair are dissimilar (e.g., employment positions in entirely different fields), the analysis module 240 determines satisfaction of the skip criteria and skips determining the node similarity score for the particular aligned node pair.

In some embodiments, if the analysis module 240 determines in the operation 1710 to skip the particular aligned node pair, the analysis module 240 applies a gap penalty (discussed below) and proceeds to the operation 1010 to realign the source node sequence and the candidate node sequence. In other example embodiments, the analysis module 240 does not realign the source node sequence and the candidate node sequence and simply proceeds to calculate the node similarity score for other aligned node pairs corresponding to the source node sequence and the candidate node sequence. Conversely, if the analysis module 240 determines not to skip the aligned node pair, the analysis module 240 performs the operation 1020, as discussed above.

At operation 1720, the analysis module 240 applies a gap penalty to the alignment score corresponding to the skipping. When the analysis module 240 applies the gap penalty, the profile similarity score is reduced. That is to say, the analysis module 240 determines that the source node sequence and the candidate node sequence are less similar when the gap penalty is applied.

To illustrate the concepts of FIG. 17A, FIG. 17B is a block diagram further illustrating an example of skipping the node similarity score for a particular aligned node pair. In FIG. 17B, node sequence 1730 includes nodes A-F and node sequence 1740 includes nodes V-Z. In this example, the analysis module 240 determines to skip the node X of node sequence 1740 and the analysis module 240 realigns the node sequences 1730 and 1740 to generate new aligned node pairs. For instance, if the analysis module 240 determines satisfaction of the skip criteria based on an analysis of the node C and the node X, the analysis module 240 generates new aligned node pairs and applies the gap penalty to the profile similarity score. In this instance, the analysis module 240 generates new aligned node pairs, for example, new aligned node pairs 1750 and 1760. Subsequent to generating the new aligned node pairs 1750 and 1760, the analysis module 240 calculates the alignment score using the new aligned node pairs 1750 and 1760. In some cases, the new aligned node pairs 1750 and 1760 include some original aligned node pairs.

Figure 18:
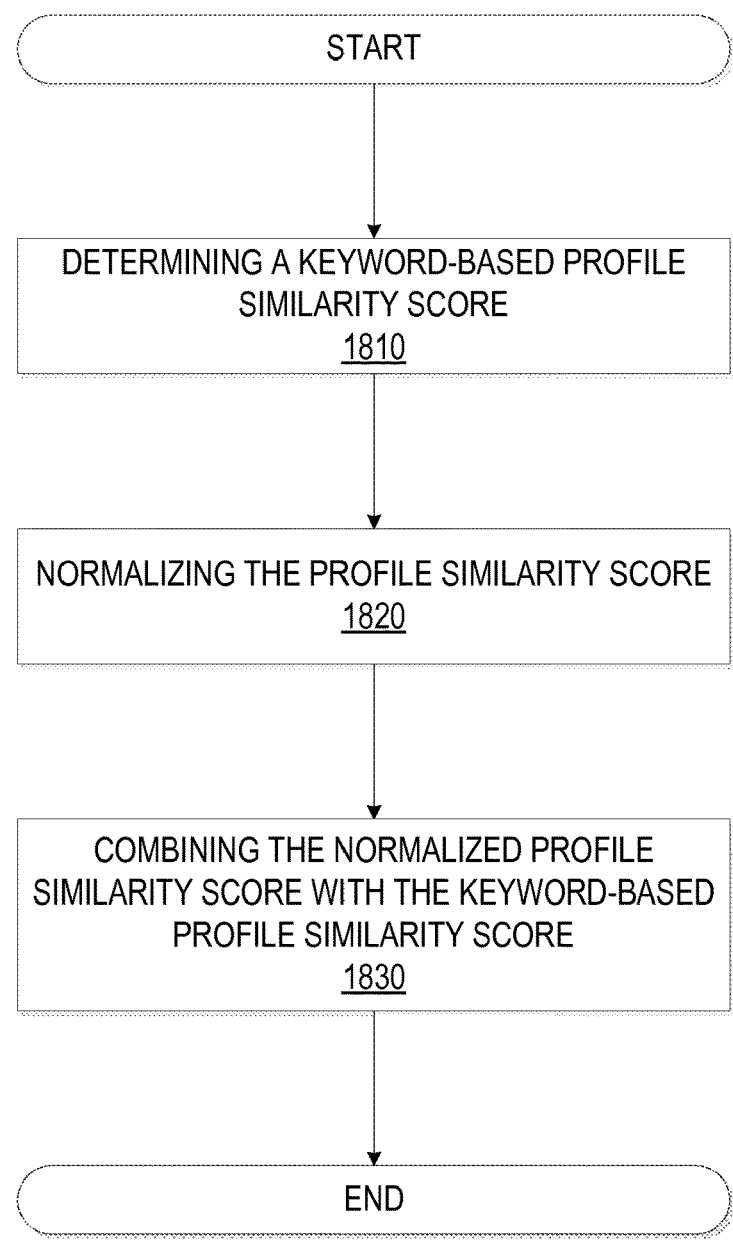
FIG. 18 is a flow diagram illustrating an example method for combining a keyword-based profile similarity score and a temporal-based profile similarity score, according to some example embodiments.

FIG. 18 is a flow diagram illustrating an example method 1800 for combining a keyword-based profile similarity score and a temporal-based profile similarity score. The operations of method 1800 can be performed by components of the profile similarity system 200.

At operation 1810, the analysis module 240 determines a keyword-based profile similarity score. For example, the analysis module 240 determines the keyword-based similarity by comparing profile features of the source profile and the plurality of candidate profiles. In an embodiment, the analysis module 240 or the data module 230 standardizes the profile features for direction matching of the source features and the candidate features. In a specific example, the analysis module 240 uses cosine-similarity to compare corresponding profile features (e.g., a skills field of the source profile and a particular candidate profile) of the source profile and a particular candidate profile of the plurality of candidate profiles to calculate the keyword-based profile similarity score. In this example, feature similarity scores, using the cosine-similarity function, are aggregated using a weighted linear combination that reflects the relative importance of particular field pairs. In some instances, the analysis module 240 determines the weighting using machine learning. In further embodiments, the analysis module 240 normalizes the keyword-based profile similarity score (e.g., using a logit function) for subsequent analysis.

At operation 1820, the analysis module 240 normalizes the profile similarity score. For instance, the analysis module 240 normalizes the profile similarity score using a logit function. In these instances, the profile similarity score is normalized for subsequent analysis and combination with the normalized keyword-based profile similarity score.

At operation 1830, the analysis module 240 combines the normalized profile similarity score with the keyword-based profile similarity score, according to some example embodiments. The analysis module 240 can combine the keyword-based profile similarity score with the normalized profile similarity score using a variety of techniques. In these embodiments, the purpose of combining the profile similarity scores is to provide a robust similarity score that can be accurate for a wide range of profile comparisons (e.g., a lack of temporal data in a particular profile may hinder results of the profile similarity score but not the keyword-based profile similarity score).

Figure 19:
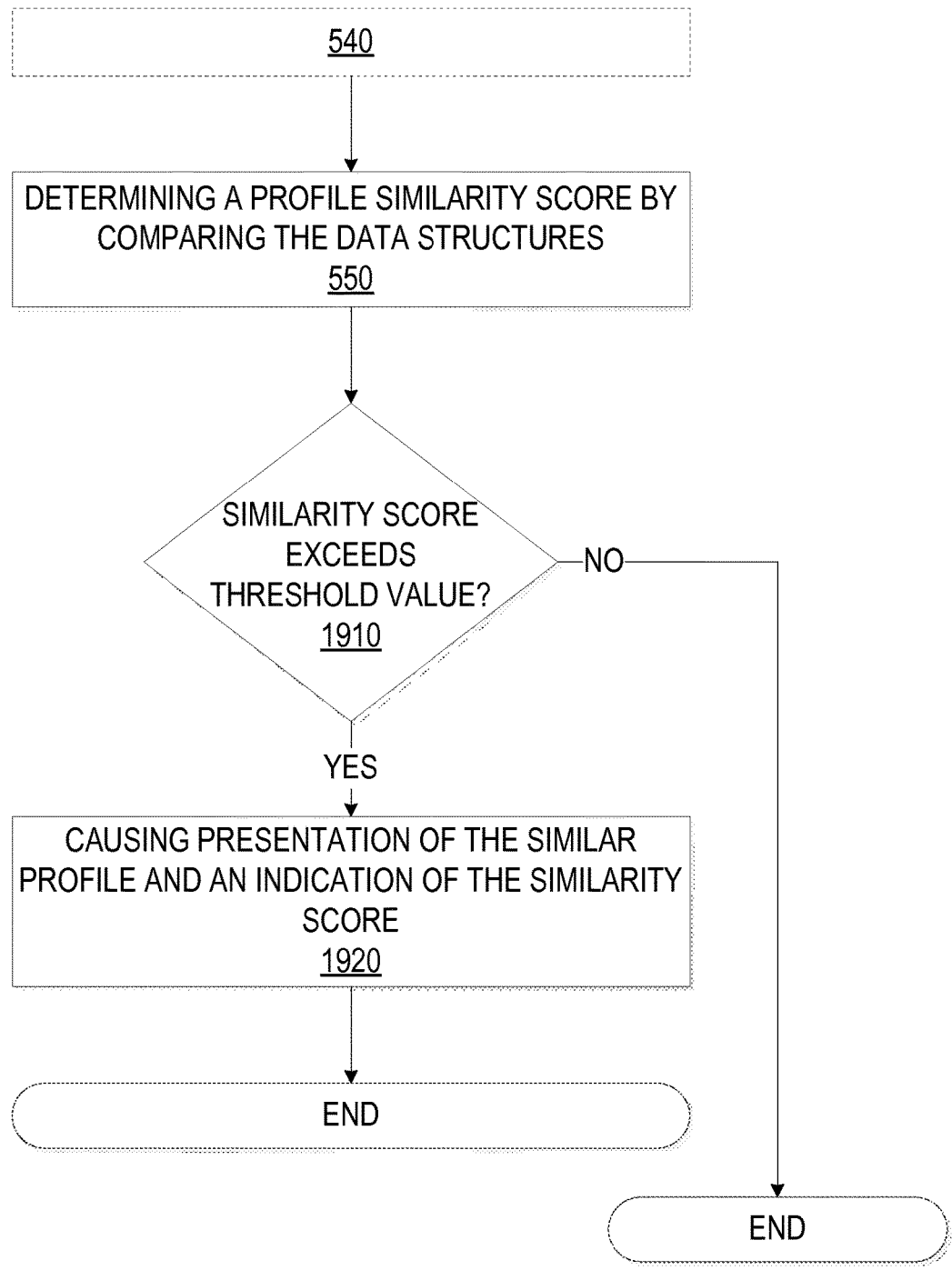
FIG. 19 is a flow diagram illustrating an example method for identifying a similar profile using the similarity score and causing presentation of the identified similar profile, according to some example embodiments.

FIG. 19 is a flow diagram illustrating an example method for identifying a similar profile using the similarity score and causing presentation of the identified similar profile. Subsequent to determining the profile similarity score at the operation 550, as discussed above, the operations of FIG. 19 are performed, according to some example embodiments.

At operation 1910, the analysis module 240 determines whether the similarity score exceeds a threshold value. For instance, in a scenario where the source profile and the candidate profile are similar, the analysis module 240 calculates a high profile similarity score that exceeds the threshold value. That is to say, the analysis module 240 determines that a particular candidate profile is the similar profile based on the profile similarity score corresponding to the particular candidate profile exceeding the threshold value. In various embodiments, the threshold value is predetermined. In other embodiments, the analysis module 240 dynamically determines the threshold value. In cases where the similarity score does not exceed the threshold value, the method ends or another candidate profile is subsequently analyzed to determine similarity to the source profile.

At operation 1920, the presentation module 210 causes presentation of the similar profile and an indication of the similarity score. For example, the presentation module 210 generates a user interface including an indication of the similar profile and an indication of the profile similarity score and transmits the user interface to the client device(s) 150 to be presented to the user 160.

Example User Interfaces

Figure 21:
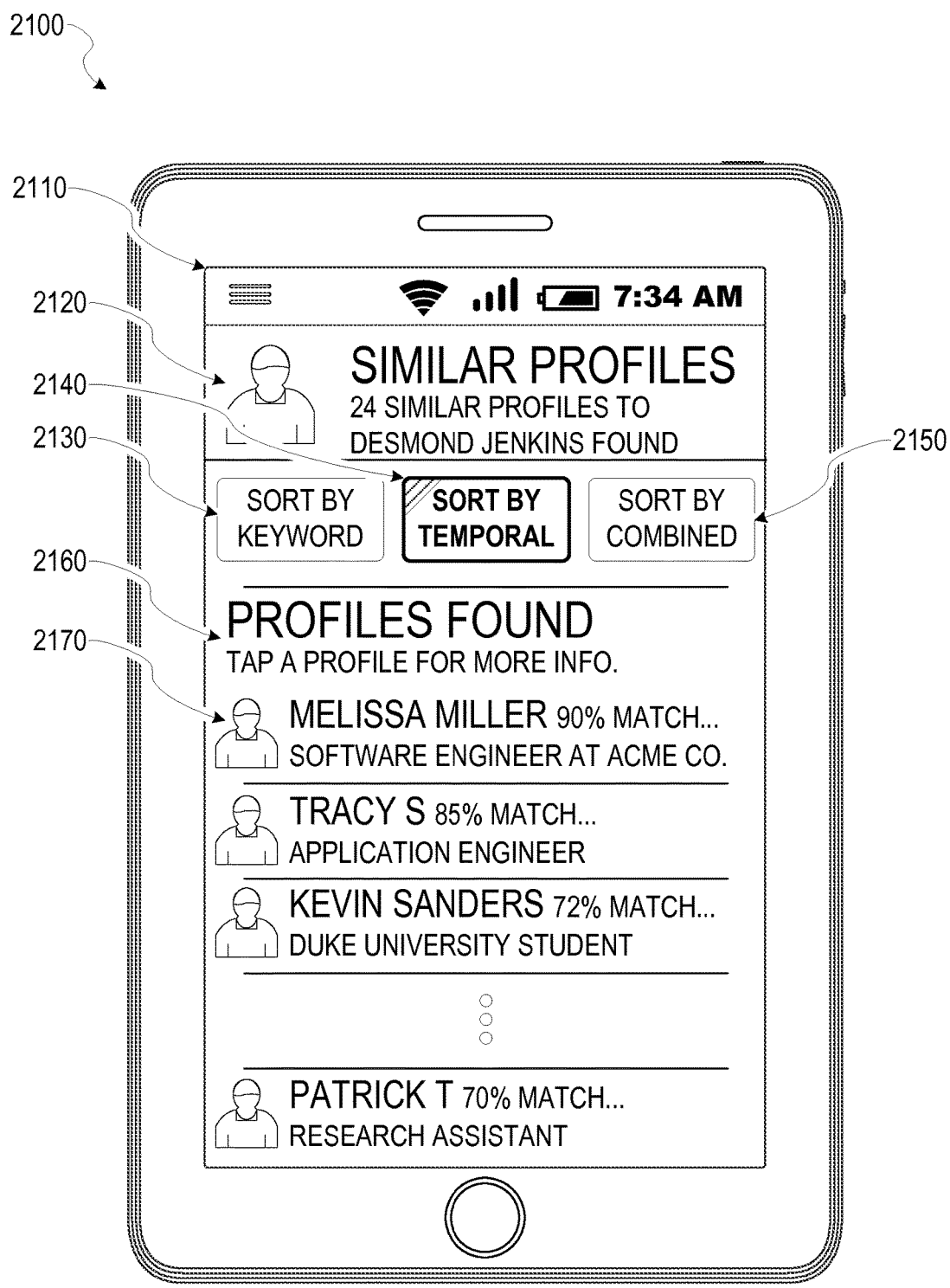

FIGS. 20 and 21 depict example user interfaces for interactively presenting information to the user. Although FIGS. 20 and 21 depict specific example user interfaces and user interface elements, these are merely non-limiting examples and many other alternate user interfaces and user interface elements may be generated by the presentation module 210 and presented to the user. It will be noted that alternate presentations of the displays of FIGS. 20 and 21 may include additional information, graphics, options, and so forth; other presentations may include less information, or may provide abridged information for easy use by the user.

FIG. 20 depicts an example user interface 2000 for interactively presenting the identified similar profiles to the user. In this example, the user interface 2000 comprises a plurality of member listings corresponding to identified similar profiles. In some embodiments, the member listings are sorted according to the profile similarity score. For instance, the member listings corresponding to highest profile similarity score is listed first. The user interface element 2010 is a particular member listing that corresponds to a particular similar profile that may be associated with a higher profile similarity score. Similarly, user interface element 2020 is another member listing corresponding to another identified similar profile that may be associated with a lower profile similarity score. The presentation module 210 can generate, and cause presentation to the user, user interfaces with many different forms and styles; FIG. 20 is merely a non-limiting example.

FIG. 21 depicts an example device 2100 (e.g., a smart phone) displaying an example user interface 2110. The user interface 2110 includes section 2120, which provides information associated with a particular search the user performed (e.g., a search for profile similar to the source profile). For instance, the section 2120 indicates a number of profiles were found that are similar to the source profile.

The user interface 2110 includes user interface elements 2130, 2140, and 2150 that, when activated by the user, sort search results from the particular search the user performed. For example, activating the user interface element 2130 sorts the search results by a keyword-based similarity metric or score, activating the user interface element 2140 sorts the search results by temporal-based similarity metric or score, and activating the user interface element 2150 sorts the search results by a combination of the keyword-based similarity metric or score and the temporal-based similarity metric or score.

Section 2160 includes the search results from the particular search the user performed. For example, the section 2160 includes entry 2170 that comprises information corresponding to a particular member profile of the social network service included in the search results. In this example, the entry 2170 includes a name of the particular member profile and a current employment position although a variety of other profile information can be included in the entry 2170. In addition, the entry 2170 includes an indication of the profile similarity score. In this example, the profile similarity score indication is a percentage where a higher percentage indicates a higher similarity to the source profile. In various embodiments, the presentation module 210 can generate the user interface 2110 to include graphical or non-graphical indications of the profile similarity score. In further example embodiments, the activating the entry 2170 causes presentation of additional profile data corresponding to the particular member profile. In some embodiments, the user designates the entry 2170, or another entry, as the source profile for an additional search.

Modules, Components, and Logic

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Software Architecture

Figure 22:
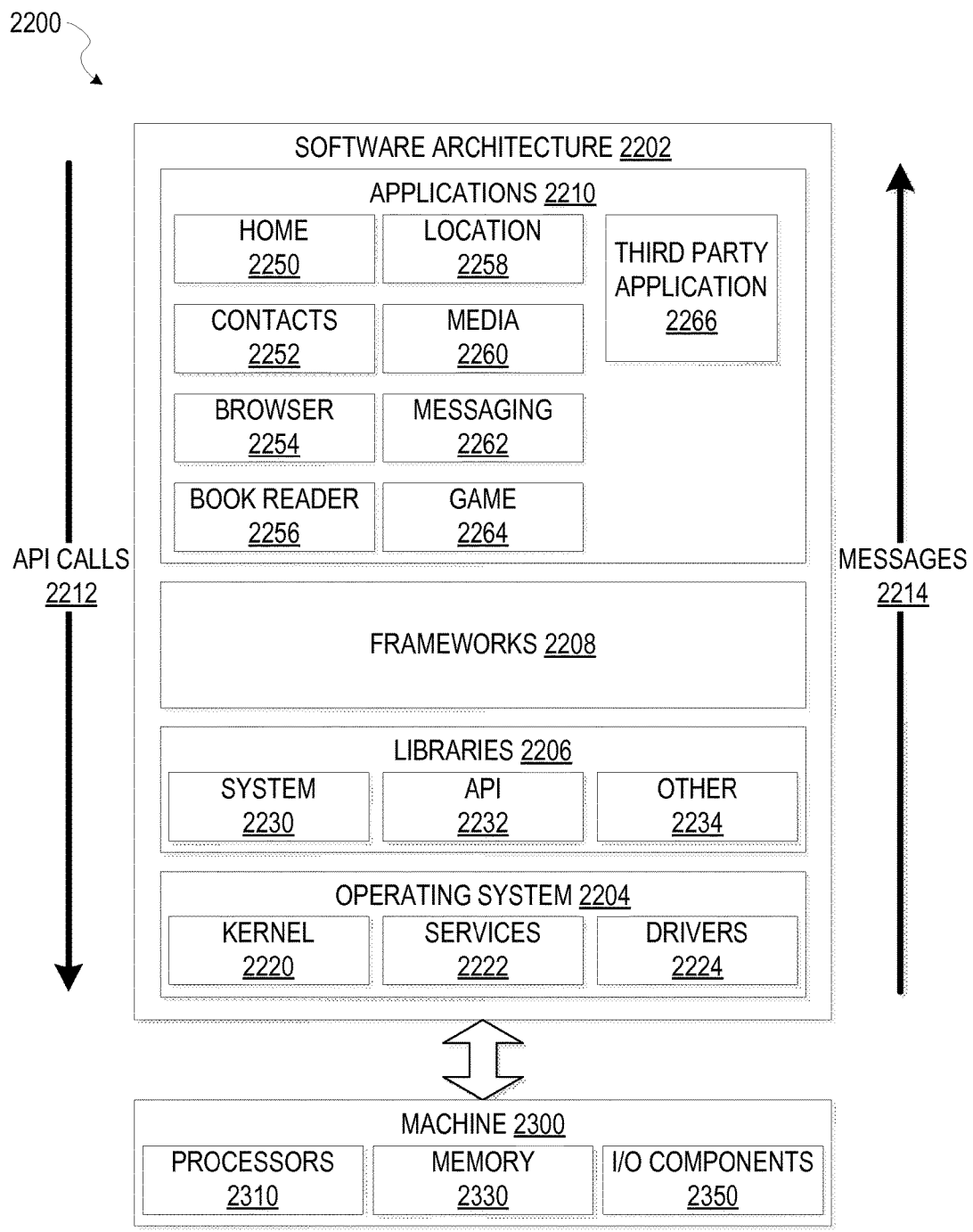
FIG. 22 is a block diagram illustrating an example of a software architecture that may be installed on a machine, according to some example embodiments.

FIG. 22 is a block diagram 2200 illustrating an architecture of software 2202, which may be installed on any one or more of the devices described above. FIG. 22 is merely a non-limiting example of a software architecture, and it will be appreciated that many other architectures may be implemented to facilitate the functionality described herein. The software 2202 may be implemented by hardware such as machine 2300 of FIG. 23 that includes processors 2310, memory 2330, and I/O components 2350. In this example architecture, the software 2202 may be conceptualized as a stack of layers where each layer may provide a particular functionality. For example, the software 2202 includes layers such as an operating system 2204, libraries 2206, frameworks 2208, and applications 2210. Operationally, the applications 2210 invoke application programming interface (API) calls 2212 through the software stack and receive messages 2214 in response to the API calls 2212, according to some implementations.

In various implementations, the operating system 2204 manages hardware resources and provides common services. The operating system 2204 includes, for example, a kernel 2220, services 2222, and drivers 2224. The kernel 2220 acts as an abstraction layer between the hardware and the other software layers in some implementations. For example, the kernel 2220 provides memory management, processor management (e.g., scheduling), component management, networking, security settings, among other functionality. The services 2222 may provide other common services for the other software layers. The drivers 2224 may be responsible for controlling or interfacing with the underlying hardware. For instance, the drivers 2224 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 2206 provide a low-level common infrastructure that may be utilized by the applications 2210. The libraries 2206 may include system 2230 libraries (e.g., C standard library) that may provide functions such as memory allocation functions, string manipulation functions, mathematic functions, and the like. In addition, the libraries 2206 may include API libraries 2232 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2206 may also include a wide variety of other libraries 2234 to provide many other APIs to the applications 2210.

The frameworks 2208 provide a high-level common infrastructure that may be utilized by the applications 2210, according to some implementations. For example, the frameworks 2208 provide various graphic user interface (GUI) functions, high-level resource management, high-level location services, and so forth. The frameworks 2208 may provide a broad spectrum of other APIs that may be utilized by the applications 2210, some of which may be specific to a particular operating system or platform.

In an example embodiment, the applications 2210 include a home application 2250, a contacts application 2252, a browser application 2254, a book reader application 2256, a location application 2258, a media application 2260, a messaging application 2262, a game application 2264, and a broad assortment of other applications such as third party application 2266. According to some embodiments, the applications 2210 are programs that execute functions defined in the programs. Various programming languages may be employed to create one or more of the applications 2210, structured in a variety of manners, such as object-orientated programming languages (e.g., Objective-C, Java, or C++) or procedural programming languages (e.g., C or assembly language). In a specific example, the third party application 2266 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third party application 2266 may invoke the API calls 2212 provided by the mobile operating system 2204 to facilitate functionality described herein.

Example Machine Architecture and Machine-Readable Medium

Figure 23:
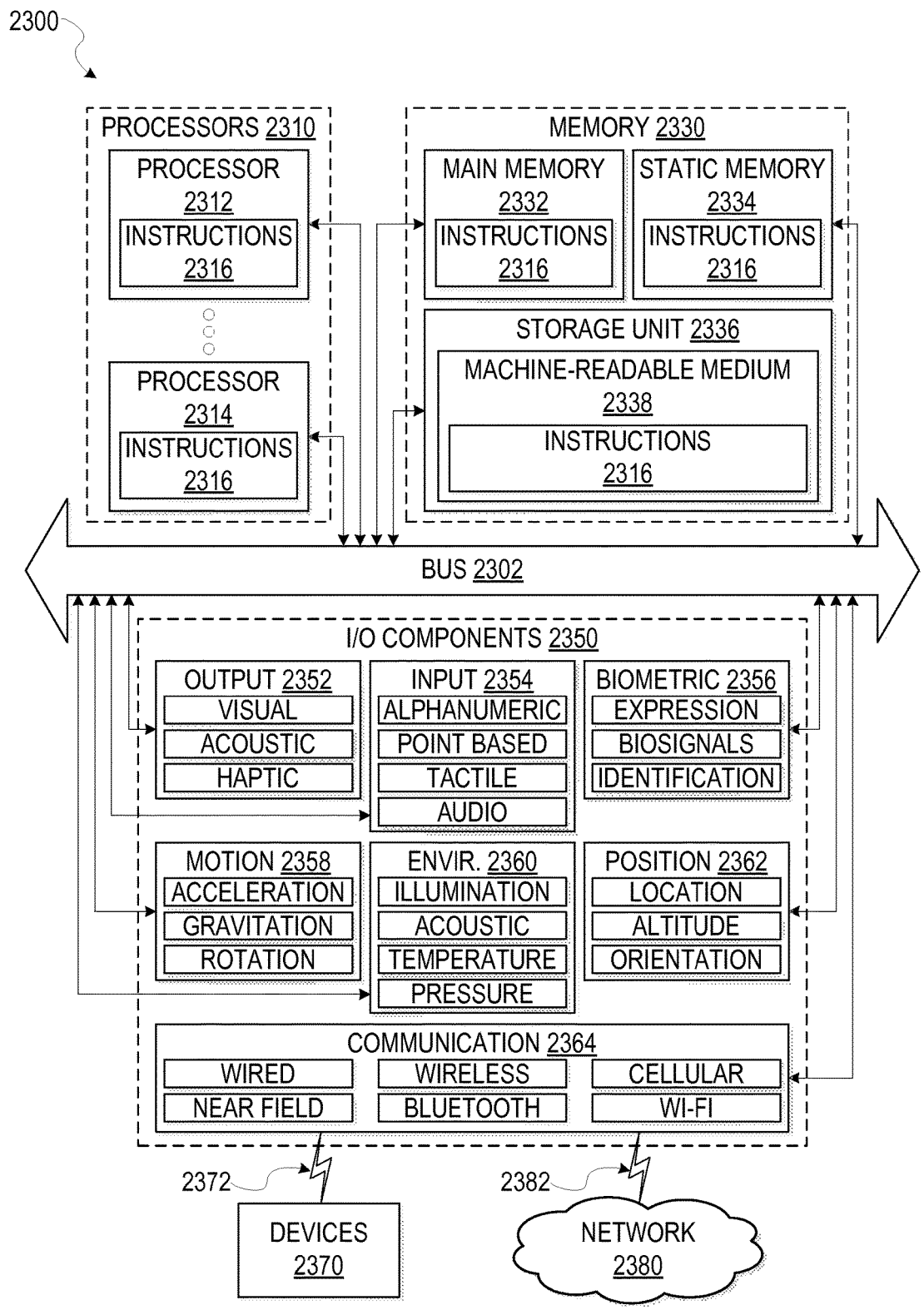
FIG. 23 illustrates a diagrammatic representation of a machine in the form of a computer system within which a set of instructions may be executed for causing the machine to perform any one or more of the methodologies discussed herein, according to an example embodiment.

FIG. 23 is a block diagram illustrating components of a machine 2300, according to some example embodiments, able to read instructions from a machine-readable medium (e.g., a machine-readable storage medium) and perform any one or more of the methodologies discussed herein. Specifically, FIG. 23 shows a diagrammatic representation of the machine 2300 in the example form of a computer system, within which instructions 2316 (e.g., software, a program, an application, an applet, an app, or other executable code) for causing the machine 2300 to perform any one or more of the methodologies discussed herein may be executed. In alternative embodiments, the machine 2300 operates as a standalone device or may be coupled (e.g., networked) to other machines. In a networked deployment, the machine 2300 may operate in the capacity of a server machine or a client machine in a server-client network environment, or as a peer machine in a peer-to-peer (or distributed) network environment. The machine 2300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 2316, sequentially or otherwise, that specify actions to be taken by machine 2300. Further, while only a single machine 2300 is illustrated, the term "machine" shall also be taken to include a collection of machines 2300 that individually or jointly execute the instructions 2316 to perform any one or more of the methodologies discussed herein.

The machine 2300 may include processors 2310, memory 2330, and I/O components 2350, which may be configured to communicate with each other via a bus 2302. In an example embodiment, the processors 2310 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 2312 and processor 2314 that may execute instructions 2316. The term "processor" is intended to include multi-core processors that may comprise two or more independent processors (also referred to as "cores") that may execute instructions contemporaneously. Although FIG. 23 shows multiple processors 2310, the machine 2300 may include a single processor with a single core, a single processor with multiple cores (e.g., a multi-core process), multiple processors with a single core, multiple processors with multiples cores, or any combination thereof.

The memory 2330 may include a main memory 2332, a static memory 2334, and a storage unit 2336 accessible to the processors 2310 via the bus 2302. The storage unit 2336 may include a machine-readable medium 2338 on which is stored the instructions 2316 embodying any one or more of the methodologies or functions described herein. The instructions 2316 may also reside, completely or at least partially, within the main memory 2332, within the static memory 2334, within at least one of the processors 2310 (e.g., within the processor's cache memory), or any suitable combination thereof, during execution thereof by the machine 2300. Accordingly, in various implementations, the main memory 2332, static memory 2334, and the processors 2310 are considered as machine-readable media 2338.

As used herein, the term "memory" refers to a machine-readable medium 2338 able to store data temporarily or permanently and may be taken to include, but not be limited to, random-access memory (RAM), read-only memory (ROM), buffer memory, flash memory, and cache memory. While the machine-readable medium 2338 is shown in an example embodiment to be a single medium, the term "machine-readable medium" should be taken to include a single medium or multiple media (e.g., a centralized or distributed database, or associated caches and servers) able to store instructions 2316. The term "machine-readable medium" shall also be taken to include any medium, or combination of multiple media, that is capable of storing instructions (e.g., instructions 2316) for execution by a machine (e.g., machine 2300), such that the instructions, when executed by one or more processors of the machine 2300 (e.g., processors 2310), cause the machine 2300 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 2350 include a wide variety of components to receive input, provide output, produce output, transmit information, exchange information, capture measurements, and so on. In general, it will be appreciated that the I/O components 2350 may include many other components that are not shown in FIG. 23. The I/O components 2350 are grouped according to functionality merely for simplifying the following discussion and the grouping is in no way limiting. In various example embodiments, the I/O components 2350 include output components 2352 and input components 2354. The output components 2352 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 2354 include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and force of touches or touch gestures, or other tactile input components), audio input components (e.g., a microphone), and the like.

In some further example embodiments, the I/O components 2350 include biometric components 2356, motion components 2358, environmental components 2360, or position components 2362 among a wide array of other components. For example, the biometric components 2356 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 2358 include acceleration sensor components (e.g., accelerometer), gravitation sensor components, rotation sensor components (e.g., gyroscope), and so forth. The environmental components 2360 include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., machine olfaction detection sensors, gas detection sensors to detection concentrations of hazardous gases for safety or to measure pollutants in the atmosphere), or other components that may provide indications, measurements, or signals corresponding to a surrounding physical environment. The position components 2362 include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2350 may include communication components 2364 operable to couple the machine 2300 to a network 2380 or devices 2370 via coupling 2382 and coupling 2372, respectively. For example, the communication components 2364 include a network interface component or another suitable device to interface with the network 2380. In further examples, communication components 2364 include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 2370 may be another machine or any of a wide variety of peripheral devices (e.g., a peripheral device coupled via a Universal Serial Bus (USB)).

Moreover, in some implementations, the communication components 2364 detect identifiers or include components operable to detect identifiers. For example, the communication components 2364 include Radio Frequency Identification (RFID) tag reader components, NFC smart tag detection components, optical reader components (e.g., an optical sensor to detect a one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, Uniform Commercial Code Reduced Space Symbology (UCC RSS)-2D bar code, and other optical codes), acoustic detection components (e.g., microphones to identify tagged audio signals), or any suitable combination thereof. In addition, a variety of information can be derived via the communication components 2364, such as, location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 2380 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 2380 or a portion of the network 2380 may include a wireless or cellular network and the coupling 2382 may be a Code Division Multiple Access (CDMA) connection, a Global System for Mobile communications (GSM) connection, or other type of cellular or wireless coupling. In this example, the coupling 2382 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

In example embodiments, the instructions 2316 are transmitted or received over the network 2380 using a transmission medium via a network interface device (e.g., a network interface component included in the communication components 2364) and utilizing any one of a number of well-known transfer protocols (e.g., Hypertext Transfer Protocol (HTTP)). Similarly, in other example embodiments, the instructions 2316 are transmitted or received using a transmission medium via the coupling 2372 (e.g., a peer-to-peer coupling) to devices 2370. The term "transmission medium" shall be taken to include any intangible medium that is capable of storing, encoding, or carrying instructions 2316 for execution by the machine 2300, and includes digital or analog communications signals or other intangible medium to facilitate communication of such software.

Furthermore, the machine-readable medium 2338 is non-transitory (in other words, not having any transitory signals) in that it does not embody a propagating signal. However, labeling the machine-readable medium 2338 as "non-transitory" should not be construed to mean that the medium is incapable of movement; the medium should be considered as being transportable from one physical location to another. Additionally, since the machine-readable medium 2338 is tangible, the medium may be considered to be a machine-readable device.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   receiving, by a computer system comprising a hardware processor of a machine, a request to identify a similar profile, from among a plurality of member profiles of members of a social network service, that is similar to a source profile of a member of the social network service, the request comprising an identifier that identifies the source profile;
   accessing, by the computer system, profile data from the social network service, the profile data including profile data of the source profile and profile data of a candidate profile from the plurality of member profiles;
   extracting, by the computer system, profile features from the profile data, the profile features including source features extracted from the profile data of the source profile and candidate features extracted from the profile data of the candidate profile, respective profile features corresponding to temporal data included in the profile data, at least a portion of the temporal data indicating that each profile feature corresponding to the at least a portion of the temporal data previously applied to the member to which the profile feature corresponds, but that the profile feature corresponding to the portion of the temporal data no longer applies to the member to which the profile feature corresponds;
   generating, by the computer system, data structures by structuring the profile features according to the temporal data, the data structures including a source data structure generated using the source features and a candidate data structure generated using the candidate features;
   calculating, by the computer system, a profile similarity score by comparing the candidate data structure with the source data structure, the profile similarity score indicating a similarity between the candidate profile and the source profile;
   determining the similar profile comprises the candidate profile based on the profile similarity score; and
   causing presentation of the similar profile to a requester that initiated the request.

2. The method of claim 1, wherein each of the data structures comprises a node sequence that includes a plurality of nodes, the node sequence generated by:
   generating the plurality of nodes using profile features of a particular member profile, wherein respective nodes of the plurality of nodes include at least one of the profile features of the particular member profile;
   ordering the plurality of nodes sequentially according to the temporal data corresponding to the profile features included in the respective nodes of the plurality of nodes; and
   assembling the node sequence with the ordered plurality of nodes.

3. The method of claim 2, wherein the generating the plurality of nodes further comprises:
   identifying an employment position from the particular member profile;
   associating a particular node of the plurality of nodes with the identified employment position; and including the profile features of the particular member profile corresponding to the identified employment position in the particular node.

4. The method of claim 2, wherein the calculating the profile similarity score further comprises:
assembling aligned node pairs by aligning the candidate data structure with the source data structure, respective aligned node pairs including a node from the candidate data structure and a node from the source data structure;
calculating a node similarity score for the respective aligned node pairs by comparing profile features of the node from the candidate data structure and profile features of the node from the source data structure;
combining the node similarity scores for the respective aligned node pairs to determine an alignment score; and
calculating the profile similarity score, in part, using the alignment score.

5. The method of claim 4, further comprising:
iterating through at least one alignment of possible alignments between the candidate data structure and the source data structure;
calculating the alignment score for respective alignments of the possible alignments;
identifying an optimal alignment score based on the alignment score for the respective alignments of the possible alignments; and
calculating the profile similarity score, in part, using the optimal alignment score.

6. The method of claim 4, further comprising:
deriving employment transition data based on profile features of a particular node sequence;
including the derived employment transition data in respective nodes of the particular node sequence according to the profile features of the particular node sequence used to derive the employment transition data; and
calculating the node similarity score, in part, using the derived employment transition data.

7. The method of claim 4, further comprising:
deriving a duration feature and a recentness feature using the temporal data;
determining a weighting factor based on at least one of the derived duration feature and the derived recentness feature; and
calculating the node similarity score, in part, using the weighting factor.

8. The method of claim 7, wherein the weighting factor comprises terms including at least one of:
a duration difference term based on a difference between the derived duration feature of the node from the candidate data structure and the node from the source data structure;
a recentness difference term based on a difference between the derived recentness feature of the node from the candidate data structure and the node from the source data structure;
a duration sum term based on a sum of the derived duration feature of the node from the candidate data structure and the node from the source data structure; and
a recentness sum based on a sum between the derived recentness feature of the node from the candidate data structure and the node from the source data structure.

9. The method of claim 2, further comprising:
identifying similar nodes among the plurality of nodes included in the node sequence by comparing the profile features included in the respective nodes of the plurality of nodes;
determining a consecutive relationship between two identified similar nodes; and
merging the identified similar nodes with the consecutive relationship in the node sequence.

10. The method of claim 4, wherein the calculating the node similarity score in calculating the node similarity score for a predetermined number of the aligned node pairs.

11. The method of claim 4, further comprises:
skipping the calculating the node similarity score based on an analysis of the profile features included in the aligned node pair; and
applying a gap penalty to the alignment score corresponding to the skipping.

12. The method of claim 4, wherein the calculating the node similarity score includes using a prediction model, the prediction model being any one of a logistic regression model, a Naive Bayes model, a support vector machines (SVM) model, a decision trees model, and a neural network model.

13. The method of claim 12, wherein the prediction model uses training data including positive training data and negative training data, wherein the training data is based on a profile search, performed by a user, for member profiles similar to another profile, the profile search providing member profile search results to the user,
wherein the positive training data is based on contacted member profiles included in results of the member profile search, the contacted member profiles being contacted by the user, and
wherein the negative training data being based on non-contacted member profiles included in the member profile search results; the non-contacted member profiles not being contacted by the user.

14. The method of claim 1, further comprising:
determining a keyword-based profile similarity score by comparing keywords of the candidate profile with keywords of the source profile;
normalizing the profile similarity score; and
combining the normalized profile similar score with the keyword-based similarity score.

15. The method of claim 1, wherein the profile features include at least one of position title, company, company size, industry, position functions, job seniority, position summary, position start date, position end data, and position duration.

16. The method of claim 6, wherein the derived employment transition data includes at least one of same company, same industry, seniority change, title change, and time gap.

17. The method of claim 1; wherein:
the determining the similar profile comprises the candidate profile based on the profile similarity score comprises determining the similar profile comprises the candidate profile when the profile similarity score exceeds a threshold value; and
causing presentation of the similar profile further comprises causing presentation of an indication of the similarity score to the requester that initiated the request.

18. A system, comprising:
a hardware-implemented communication module to receive a request to identify a similar profile, from among a plurality of member profiles of members of a social network service, that is similar to a source profile of a member of the social network service, the request comprising an identifier that identifies the source profile;
a hardware-implemented data module to access profile data of the source profile and of a candidate profile from the plurality of member profiles of the social network service;
a hardware-implemented analysis module to:
extract profile features from the profile data, the profile features include source features extracted from the profile data of the source profile and candidate features extracted from the profile data of the candidate profile, respective profile features correspond to temporal data included in the profile data, at least a portion of the temporal data indicating that each profile feature corresponding to the at least a portion of the temporal data previously applied to the member to which the profile feature corresponds, but that the profile feature corresponding to the portion of the temporal data no longer applies to the member to which the profile feature corresponds;
generate data structures by structuring the profile features based on the temporal data, the data structures including a source data structure generated using the source features and a candidate data structure generated using the candidate features;
determine a profile similarity score based on a comparison of the candidate data structure and the source data structure, the profile similarity score indicates the similarity between the candidate profile and the source profile;
determining the similar profile comprises the candidate profile based on the profile similarity score; and
causing presentation of the similar profile to a requester that initiated the request.

19. A machine-readable medium having no transitory signals and storing instructions that, when executed by at least one processor of a machine, cause the machine to perform operations comprising:
receiving a request to identify a similar profile, from among a plurality of member profiles of members of a social network service, that is similar to a source profile of a member of the social network service, the request comprising an identifier that identifies the source profile;
accessing profile data of the source profile and of a candidate profile from the plurality of member profiles of the social network service;
extracting profile features from the profile data, the profile features including source features extracted from the profile data of the source profile and candidate features extracted from the profile data of the candidate profile, respective profile features corresponding to temporal data included in the profile data, at least a portion of the temporal data indicating that each profile feature corresponding to the at least a portion of the temporal data previously applied to the member to which the profile feature corresponds, but that the profile feature corresponding to the portion of the temporal data no longer applies to the member to which the profile feature corresponds;
generating data structures by structuring the profile features according to the temporal data, the data structures including a source data structure generated using the source features and a candidate data structure generated using the candidate features;
determining, using a hardware processor of a machine, a profile similarity score by comparing the candidate data structure with the source data structure, the profile similarity score indicating a similarity between the candidate profile and the source profile;
determining the similar profile comprises the candidate profile based on the profile similarity score; and
causing presentation of the similar profile to a requester that initiated the request.

20. The machine-readable medium of claim 19, wherein each of the data structures comprises a node sequence that includes a plurality of nodes, wherein the operations further comprise the node sequence being generated by:
generating the plurality of nodes using profile features of a particular member profile, wherein respective nodes of the plurality of nodes include at least one of the profile features of the particular member profile;
ordering the plurality of nodes sequentially according to the temporal data corresponding to the profile features included in the respective nodes of the plurality of nodes; and
assembling the node sequence with the ordered plurality of nodes.

* * * * *

UNITED STATES PATENT AND TRADEMARK OFFICE
CERTIFICATE OF CORRECTION

PATENT NO. : 10,042,894 B2  
APPLICATION NO. : 14/528643  
DATED : August 7, 2018  
INVENTOR(S) : Xu et al.

Page 1 of 1

It is certified that error appears in the above-identified patent and that said Letters Patent is hereby corrected as shown below:

In the Claims

In Column 30, Line 11, in Claim 10, delete "in" and insert --includes-- therefor In Column 30, Line 37, in Claim 13, delete "results;" and insert --results,-- therefor In Column 30, Line 49, in Claim 15, delete "data," and insert --date,-- therefor In Column 30, Line 53, in Claim 17, delete "claim 1;" and insert --claim 1,-- therefor Signed and Sealed this  
Twenty-eighth Day of May, 2019

Andrei Iancu  
*Director of the United States Patent and Trademark Office*